(12) United States Patent
Kakimoto et al.

(10) Patent No.: US 7,639,578 B2
(45) Date of Patent: Dec. 29, 2009

(54) OPTICAL RECORDING APPARATUS

(75) Inventors: Hiroya Kakimoto, Gunma (JP); Mitsuo Sekiguchi, Gunma (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 469 days.

(21) Appl. No.: 11/088,635

(22) Filed: Mar. 23, 2005

(65) Prior Publication Data

US 2005/0243670 A1 Nov. 3, 2005

(30) Foreign Application Priority Data

Mar. 24, 2004 (JP) ............................. 2004-086879

(51) Int. Cl.
*G11B 15/52* (2006.01)
(52) U.S. Cl. ................ 369/47.53; 369/53.27
(58) Field of Classification Search .............. 369/47.53, 369/53.31, 53.35, 53.36, 59.11, 47.5, 47.51, 369/47.52
See application file for complete search history.

(56) References Cited

U.S. PATENT DOCUMENTS

| | | | | |
|---|---|---|---|---|
| 6,141,306 A * | 10/2000 | Andoh | ................... | 369/53.35 |
| 6,557,126 B1 * | 4/2003 | Kelly | ................... | 714/708 |
| 6,975,572 B2 * | 12/2005 | Matsumoto | ................... | 369/47.53 |
| 7,263,043 B2 * | 8/2007 | Watanabe et al. | ................... | 369/47.5 |
| 7,352,668 B2 * | 4/2008 | Shimakawa | ................... | 369/47.5 |
| 2002/0031069 A1 * | 3/2002 | Nakane et al. | ................... | 369/53.15 |
| 2002/0105874 A1 * | 8/2002 | Matsumoto | ................... | 369/47.53 |
| 2003/0022398 A1 * | 1/2003 | Weng et al. | ................... | 438/14 |
| 2004/0141442 A1 * | 7/2004 | Suzuki | ................... | 369/47.53 |

FOREIGN PATENT DOCUMENTS

| | | | |
|---|---|---|---|
| EP | 1515314 A1 * | 3/2005 | |
| JP | 3024282 | 5/1993 | |
| JP | 2001-126254 | 5/2001 | |
| WO | WO03075265 A2 * | 9/2003 | |
| WO | WO 2004075181 A1 * | 9/2004 | |

* cited by examiner

*Primary Examiner*—Paul Huber
(74) *Attorney, Agent, or Firm*—Knobbe Martens Olson & Bear LLP

(57) ABSTRACT

Several drives individually carry out recording and playback with a reference medium that serves as a reference for quality for various media, obtaining characteristic values. The characteristic values are multiplied by a predetermined coefficient to obtain thresholds, and the thresholds are stored in predetermined storage areas of the respective drives. When information is to be recorded on a medium, recording and playback are carried out with the medium under a plurality of recording conditions involving variation in power or pulse width, thereby obtaining characteristic values. Then, an approximated curve is obtained from the characteristic values. The quality of recording on the medium is tested based on an amount of margin that is determined according to positional relationship between the approximated curve and the threshold.

5 Claims, 21 Drawing Sheets

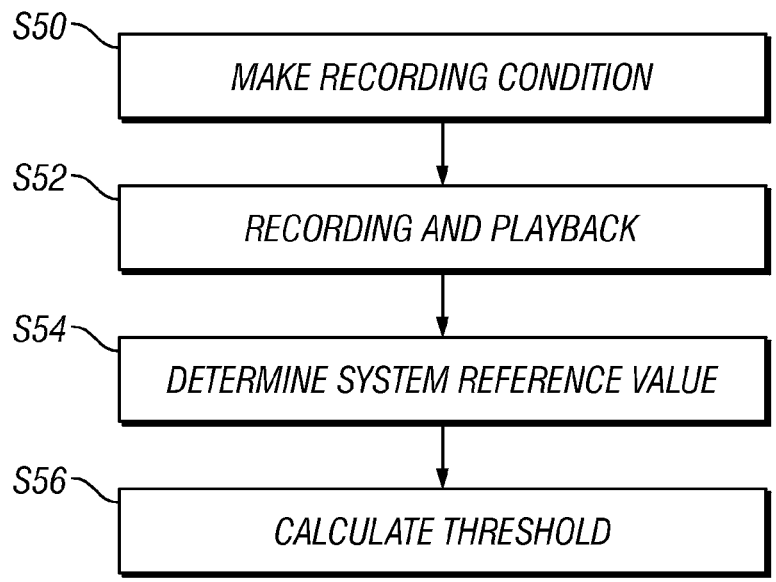
FIG. 3
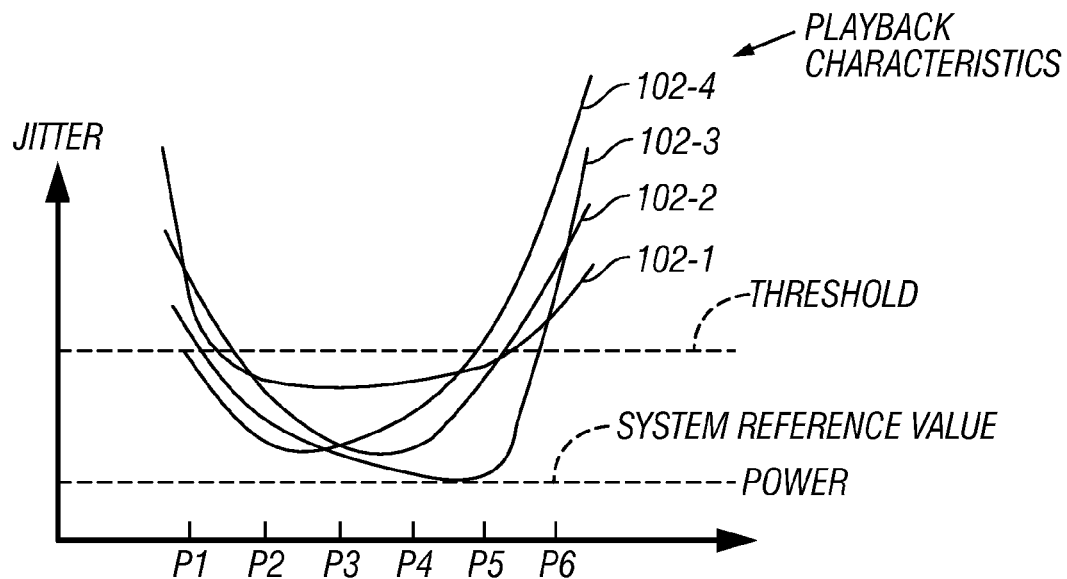
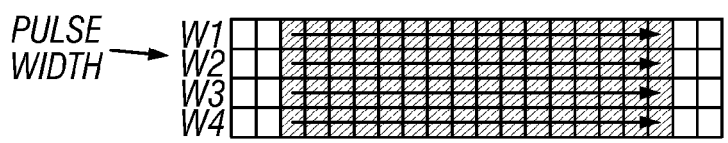
FIG. 4

| No. | SHAPE | RELATIONSHIP WITH THRESHOLD | PREDICTED RECORDING CHARACTERISTICS | PULSE WIDTH |
|---|---|---|---|---|
| 1 | ARBITRARY | MAXIMUM JITTER ≤ THRESHOLD | SAME SENSITIVITY | ± 0.2T |
| 2 | VALLEY | MINIMUM JITTER ≤ THRESHOLD | SAME SENSITIVITY | ± 0.1T |
| 3 | VALLEY | MINIMUM JITTER > THRESHOLD | SAME SENSITIVITY, AND MUCH DIFFERENCE IN MEDIA CHARACTERISTICS | ± 0.2T |
| 4 | RIGHT-DECREASING | MINIMUM JITTER ≤ THRESHOLD | SOMEWHAT LOWER SENSITIVITY | + 0.1T<br>+ 0.2T |
| 5 | RIGHT-DECREASING | MINIMUM JITTER > THRESHOLD | MUCH LOWER SENSITIVITY | + 0.2T<br>+ 0.4T |
| 6 | RIGHT-DECREASING | MINIMUM JITTER ≤ THRESHOLD | SOMEWHAT HIGHER SENSITIVITY | − 0.1T<br>− 0.2T |
| 7 | RIGHT-DECREASING | MINIMUM JITTER > THRESHOLD | MUCH HIGHER SENSITIVITY | − 0.2T<br>− 0.4T |
| 8 | MOUNTAIN | MAXIMUM JITTER > THRESHOLD | NOT AVAILABLE | ± 0.2T |

FIG. 14

OPTICAL RECORDING APPARATUS

BACKGROUND OF THE INVENTION

1. Field of the Invention

The present invention relates to optical recording apparatuses such as optical disk recording apparatuses. More specifically, the present invention relates to an optical recording apparatus provided with a reference value that is useful in testing recording quality.

2. Description of the Related Art

In recording of data on optical information recording media such as CD-R and DVD-R (hereinafter referred to as a medium), matching between a medium on which data is to be recorded and a recording apparatus (hereinafter referred to as a drive) used for recording differs among combinations of a medium and recording apparatus. This is due to factors relating to the medium such as variation in optimal recording condition due to difference in the type of recording material of the medium or due to variation that occurs in film formation during manufacturing, and due to factors relating to the drive such as variation in optimal recording condition due to variation in assembly during manufacturing or due to difference in the type of pickup or semiconductor laser included in the drive. Practically, a recording condition that is suitable for each combination of a medium and a drive is determined by a combination of these factors.

Thus, conventionally, ID information that allows a drive to identify the type of a medium is stored in the medium, and recording conditions prepared in advance for individual media types are stored in the drive. When information is actually recorded, ID information of a medium loaded onto the drive is read from the medium, and a recording condition associated with the ID information is used.

Although the conventional method allows to select a recording condition that is suitable to a certain degree for a medium of a known type that has been examined in advance, in some cases, prepared recording conditions are not suitable for a medium of an unknown type that has not been examined. Furthermore, prepared recording conditions are sometimes not suitable even for a medium of a known type, depending on, for example, recording speed, disturbance, or aging.

Japanese Unexamined Patent Application Publication No. 2001-126254 describes a method for dealing with media of unknown types. According to the method described in the document, in order to allow a drive to obtain by itself an optimal recording condition on a medium-by-medium basis (refer to paragraph 0009), an asymmetry value β and a pit length obtained by carrying out playback with a reference disk are stored in an EEPROM of the drive (refer to paragraph 0028). A β value obtained by carrying out test recording with a medium to be used for recording is compared with the β value stored in the EEPROM, and recording strategy is corrected so that desired β value and pit length will be achieved (refer to paragraphs 0029 to 0031).

According to the method, recording strategy can be optimized on a medium-by-medium basis. Accordingly, the capability of dealing with media of unknown types is improved. Furthermore, since desired β value and pit length are set on a drive-by-drive basis, variation caused by factors relating to drives is absorbed (refer to paragraph 0036).

According to the method, however, since playback is carried out with a reference disk having pits conforming to a predefined standard and a result obtained by the playback is used as a reference value for the drive, various factors that affect recording are not considered, so that the method is not sufficient to provide a standard recording environment.

Furthermore, optimal value of β differs among individual media due to the nature of β value. More specifically, β=0 is not an optimal value for all media. For example, β=5% is an optimal value for a medium A, while β=10% is an optimal value for a medium B. Thus, a β value obtained simply by carrying out playback with a single reference disk does not serve as a criterion for testing quality of other media, so that it does not suffice as a criterion for testing recording quality.

Furthermore, the β value used as a criterion is not necessarily an optimal value. It is possible that the drive allows a more suitable recording condition but the result of the playback with the reference disk is used as a criterion. Therefore, a room for improvement exits as to the capability of dealing with media of unknown types.

Furthermore, according to the method, since the recording strategy is corrected so that β value and pit length will be closer to desired values, it is difficult to deal with a combination of a drive and a medium for which it is not possible to adjust to desired values.

Furthermore, since the β value and pit length that are used as reference values in the method are values desired for recording by the particular drive, it is difficult to evaluate matching between drives and media based on the magnitudes of these values. Therefore, the β value and pit length are not sufficient as criteria for evaluating matching between drives and media.

SUMMARY OF THE INVENTION

One aspect of the present invention provides an effective method of testing recording quality that is determined by a combination of a drive and a medium.

Another aspect of the present invention provides an optical recording apparatus for recording information on an optical recording medium by irradiating the optical recording medium with laser pulses. In the optical recording apparatus, recording and playback are carried out with a reference medium that serves as a reference for quality of the optical recording medium, thereby obtaining a characteristic value, and the characteristic value is provided as a criterion of recording quality.

In the optical recording apparatus, recording and playback are carried out with a reference medium to produce a recording environment that is determined by a combination of a drive and a medium, and a system reference value that is specific to the drive is determined based on the information obtained. The system reference value serves as a reference indicating matching when various media are recoded by the drive. The system reference value enables testing of recording quality for a variety of media.

More specifically, when recording quality is to be tested, a reference value for determining the level of recording quality is needed. As described in Japanese Unexamined Patent Application Publication No. 2001-126254, if the reference value is a value obtained based on playback characteristics, it is not possible to standardize various factors that affect recording, so that the accuracy of determining recording quality is insufficient.

Since the optical recording apparatus is provided with a system reference value that is a characteristic value obtained by carrying out recording and playback with a reference medium, factors that cause variation in recording characteristics and playback characteristics as viewed from the drive are fixed. Thus, it is possible to determine the level of recording quality for a wide variety of media.

The criterion of recording quality may be the system reference value itself, a threshold obtained by multiplying the system reference value by a predetermined coefficient, or a margin defined by positional relationship between the threshold and a characteristic curve of jitter or the like. Preferably, the reference medium is a medium having standard recording characteristics among a wide variety of media. In the optical recording apparatus, using a test area or an unused recording area of the reference medium, recording and playback are carried out using 8-16 signals, EFM signals, or a specific test pattern to test recording quality.

Preferably, the test pattern used at this time is a pattern in which information needed to test quality appears efficiently so that the test will be completed in a short time using a small recording area. Furthermore, in order to allow stable recording over a range from low speed to high speed, it is effective to include a pattern that stabilizes servo sampling in addition to a pattern needed for testing quality. Furthermore, it is also effective to change test pattern between low speed and high speed or in accordance with recording speed.

Preferably, recording and playback are carried out with the reference medium under a plurality of recording conditions involving different recording speeds, thereby obtaining a plurality of characteristic values, and the plurality of characteristic values is stored in a predetermined storage area as criteria associated with the respective recording speeds.

Since recording characteristics determined by a combination of a drive and a medium are considerably affected by recording speed, recording condition can be optimized in accordance with recording speed by preparing criteria for respective recording speeds.

Also preferably, recording and playback are carried out with the reference medium under a plurality of recording conditions involving variation in power or pulse width, thereby obtaining a plurality of characteristic values, and an optimal characteristic value among the plurality of characteristic values is stored in a predetermined storage area as the criterion.

By selecting an optimal characteristic value from a plurality of characteristic values obtained under a plurality of recording conditions, a more suitable characteristic value for the drive is used as a reference. Thus, the accuracy of criterion of recording quality is improved, and an optimal condition can be chosen even if a drive and a medium do not match well. A system reference value, threshold, or margin that serves as a criterion of recording quality is preferably stored in a non-volatile memory provided in the drive.

More preferably, the criterion is a threshold obtained by multiplying the optimal characteristics value by a predetermined coefficient. Accordingly, when recording quality is tested using a characteristic curve having a pole, such as a jitter curve, since a threshold that serves as a criterion of recording quality is set at a point higher than a minimum point of the characteristic curve, it is possible to determine the level of recording quality based on the magnitude of the amount of margin defined by intersections between the threshold and the characteristic curve.

The criterion is preferably a value that is specific to the optical recording apparatus or a value that is specific to a type of the optical recording apparatus. When the criterion is a value that is specific to each apparatus, variation among individual apparatuses is absorbed as much as possible. When the criterion is a value that is specific to each type of apparatus, the number of setting steps is reduced compared with the case where the value is apparatus specific. Alternatively, the criterion may be an average value of system reference values obtained with a plurality of optical recording apparatuses. This also serves to reduce the number of setting steps.

Another aspect of the present invention provides an optical recording apparatus for recording information on an optical recording medium by irradiating the optical recording medium with laser pulses. In the optical recording apparatus, a criterion that is specific to the optical recording apparatus is provided, recording quality of the optical recording medium is tested using the criterion, and a recording condition is determined based on the recording quality determined.

As described above, the level of recording quality is determined using a reference value that is specific to the drive. When the recording quality is good, recording condition is optimized using a procedure that is specific to a case where recording quality is good. When the recording quality is not good, recording condition is optimized using a procedure that is specific to a case where recording quality is not good. Accordingly, it is possible to deal with a wider variety of recording environments.

As described above, in the optical recording apparatus, recording condition is optimized in accordance with recording quality. Since the effect of aging of a drive or a medium, if any, appears in the level of recording quality, recording condition is optimized with the effect of aging taken into consideration. In contrast, according to the method described in Japanese Unexamined Patent Application Publication No. 2001-126254, when aging of a drive occurs, a target value is changed, so that the capability of dealing with aging is insufficient.

In the optical recording apparatus, instead of carrying out correction so as to achieve a value closer to a target reference value as described in Japanese Unexamined Patent Application Publication No. 2001-126254, for example, recording condition is shifted to the side of low power and narrow pulse width when it is determined that recording quality has a high sensitivity, and recording condition is shifted to the side of high power and wide pulse width when it is determined that recording quality has a low sensitivity.

However, use of a β value as a reference value is not excluded. For example, it is possible to store a β value obtained for a combination of a drive and a medium in a non-volatile memory of the drive during testing of recording quality and to use the β value as a target value when recording is carried out under the same or similar condition. When a β value is used as a target value as described above, preferably, a target β value is stored for each combination of a drive and a medium, and more preferably, a β value for each recording speed is obtained.

Another aspect of the present invention provides an optical recording apparatus for recording information on an optical recording medium by irradiating the optical recording medium with laser pulses. In the optical recording apparatus, a criterion that is specific to the optical recording apparatus is provided, recording quality of the optical recording medium is tested using the criterion, and a result of the test is reported. Accordingly, when a medium that does not match well with the drive and that inhibits recording is loaded, it is possible to send a message indicating that recording is inhibited to a peripheral device or a user or to request modification of recording condition.

For example, when a medium loaded on a drive has an extremely low sensitivity, an alert signal is issued before actual recording is carried out, and recording condition is modified suitably or recording operation is stopped, avoiding recording at a low sensitivity that prohibits playback or that causes low-quality playback. Accordingly, loss of a media area due to inappropriate recording is avoided.

Another aspect of the present invention provides an optical recording apparatus for recording information on an optical recording medium by irradiating the optical recording medium with laser pulses. In the optical recording apparatus, a jitter value or an error rate that serves as a criterion of quality of recording on the optical recording medium is stored in a predetermined storage area. By using a jitter value or an error rate as a reference value as just described, it is possible to determine the level of recording quality by the magnitude of the reference value. This is preferable as a reference for testing recording quality.

More specifically, the value used as a reference in the optical recording apparatus is preferably an absolute reference that does not depend much on recording environment and that allows determination of the level of quality based on the magnitude thereof or a deviation from the reference value. For example, regarding the β value described in Japanese Unexamined Patent Application Publication No. 2001-126254, β=0 is not necessarily optimal, and media with different thermal characteristics have different optimal β values. Thus, it is difficult to use a β value as a reference for recording quality of various media.

Another aspect of the present invention provides an optical recording apparatus for recording information on an optical recording medium by irradiating the optical recording medium with laser pulses. In the optical recording apparatus, recording and playback are carried out with a reference medium that serves as a reference for quality of the optical recording medium, thereby obtaining a characteristic value, the characteristic value is multiplied by a predetermined coefficient to obtain a threshold, and the threshold is stored in advance in a predetermined storage area. When information is to be recorded on the optical recording medium, recording and playback are carried out under a plurality of recording conditions involving variation in power or pulse width, thereby obtaining a plurality of characteristic values, an approximated curve is obtained from the plurality of characteristic values, and quality of recording on the optical recording medium is tested based on an amount of margin that is determined according to positional relationship between the approximated curve and the threshold.

As described above, before actual recording, test recording is carried out with a medium on which information is to be recorded while changing power or pulse width, and an approximated curve such as a jitter curve obtained by the test recording is compared with a threshold stored in advance in the drive. Thus, recording quality of a recording system formed by the drive and the medium is suitably tested.

Preferably, an amount of margin that is determined according to positional relationship between the approximated curve and the threshold is used as the criterion of recording quality. By using the magnitude of the amount of margin as a reference, it is possible to determine recording quality more precisely. For example, since recording quality tends to be good when the amount of margin is large while recording quality tends to be not good when the amount of margin is small, it is possible to deny recording by the drive on a medium that fails to provide a prescribed amount of margin. As just described, by determining the level of recording quality based on the magnitude of the amount of margin and making recording condition in accordance with recording quality, it is possible to implement a recording system that is insusceptible to various effects such as disturbance, variation among drives, and variation among media.

Another aspect of the present invention provides an optical recording apparatus for recording information on an optical recording medium by irradiating the optical recording medium with laser pulses. In the optical recording apparatus, recording quality is determined using a characteristic value obtained by carrying out recording and playback with a reference medium that serves as a reference for quality of the optical recording medium, and using a status value obtained by detecting a status of the optical recording apparatus and/or the optical recording medium.

It is effective to use a detected value of temperature in the drive or temperature of the medium as the status value and to determine recording quality with consideration of temperature dependency. Such a method of detecting a status is disclosed in Japanese Patent No. 3024282, and the content of the document is incorporated herein by reference.

Still another aspect of the present invention provides an optical recording method for recording information on an optical recording medium by irradiating the optical recording medium with laser pulses. The method includes the steps of carrying out recording and playback with a reference medium that serves as a reference for quality of the optical recording medium, thereby obtaining a characteristic value; and using the characteristic value as a reference for determining recording quality.

Still another aspect of the present invention provides an optical recording method for recording information on an optical recording medium by irradiating the optical recording medium with laser pulses. The optical recording method includes the steps of carrying out recording and playback with a reference medium that serves as a reference for quality of the optical recording medium, thereby obtaining a characteristic value; multiplying the characteristics value by a predetermined coefficient to obtain a threshold and storing the threshold in advance in a predetermined storage area; carrying out recording and playback under a plurality of recording conditions involving variation in power or pulse width when information is to be recorded on the optical recording medium, thereby obtaining a plurality of characteristic values; obtaining an approximated curve using the plurality of characteristic values; and testing quality of recording on the optical recording medium based on an amount of margin that is determined according to positional relationship between the approximated curve and the threshold.

Yet another aspect of the present invention provides an optical recording method for recording information on an optical recording medium by irradiating the optical recording medium with laser pulses. The optical recording method includes the step of determining recording quality using a characteristic value obtained by carrying out recording and playback with a reference medium that serves as a reference for quality of the optical recording medium, and using a status value obtained by detecting a status of the optical recording medium.

According to embodiments of the present invention, a more suitable recording condition is made in accordance with a combination of a drive and a medium, so that it is possible to deal with a combination of drive and medium for which recording is not allowed by conventional method. Furthermore, one embodiment of the present invention allows optimization of recording condition for a combination of a drive and a medium for which full optimization is not allowed by the conventional method. Embodiments of the present invention can be applied, for example, to a recording system under a severe recording environment, such as high-speed recording or high-density recording.

BRIEF DESCRIPTION OF THE DRAWINGS

FIG. 3 is a flowchart showing details of a step of determining a reference threshold, shown in FIG. 2.

FIG. 4 is a schematic diagram showing an example relating to the flow shown in FIG. 3.

FIG. 14 is a diagram showing an example where eight patterns are used in step S20 shown in FIG. 2.

DESCRIPTION OF THE PREFERRED EMBODIMENTS

Figure 1:
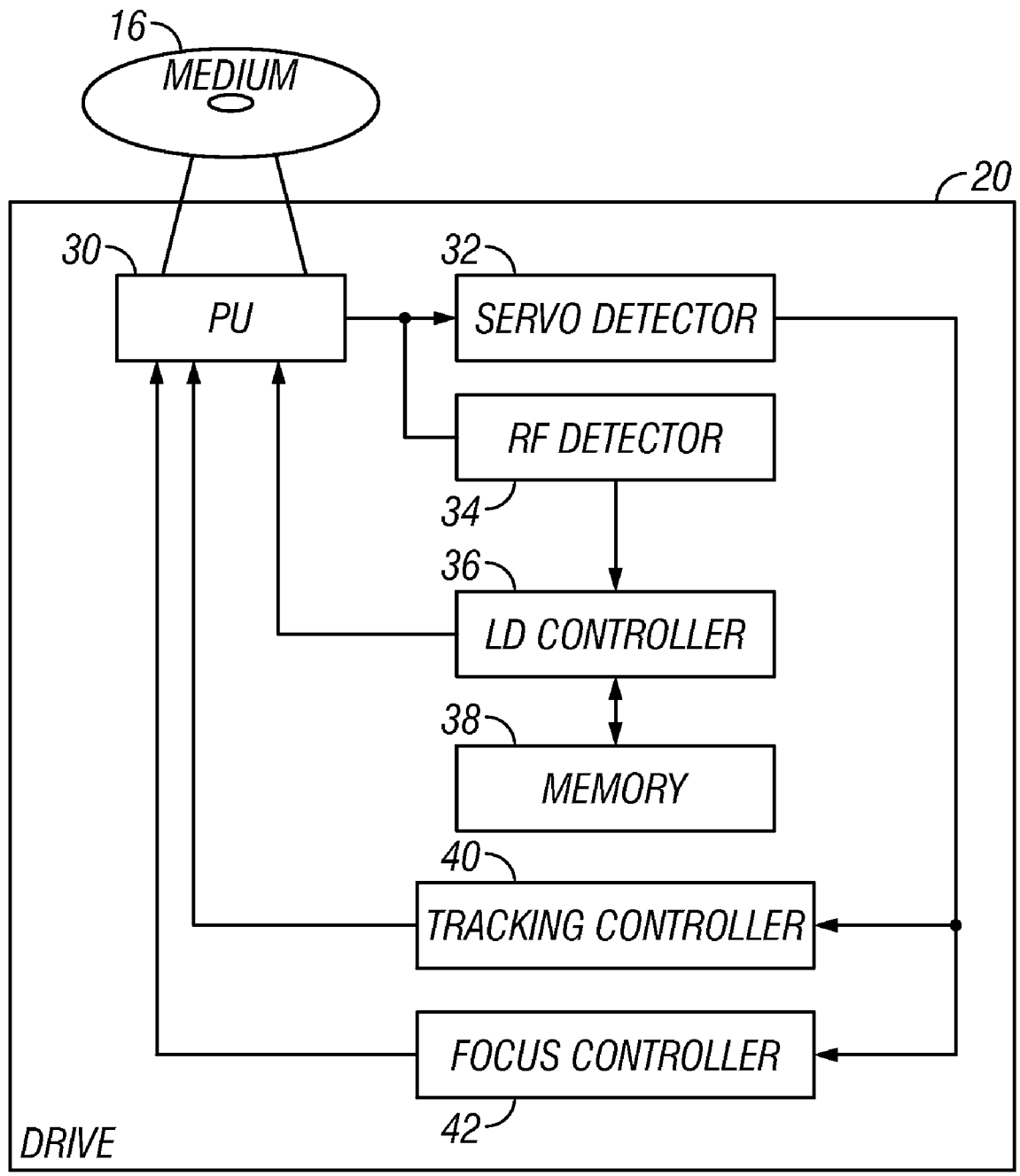
FIG. 1 is a block diagram showing an optical information recording medium and the overall construction of an optical information recording apparatus according to an embodiment of the present invention.

An optical-information recording apparatus according to an embodiment of the present invention will be described with reference to the drawings. The present invention can be accomplished in various ways including, but not limited to, the foregoing embodiments FIG. 1 is a block diagram showing the overall construction of a recording system including a medium and a drive according to an embodiment of the present invention. Referring to FIG. 1, the recording system includes a drive 20 according to this embodiment, and a medium 16 for recording by the drive 20. The medium 16 can be an optical-information recording medium, for example, a dye-based medium such as a CD-R or DVD-R, or a phase-change medium such as a CD-RW or DVD-RW.

As shown in FIG. 1, the drive 20 includes a pickup 30 that forms an optical system for irradiating the medium 16 with laser beams, a servo detector 32 for detecting geometric information of a control position of the pickup 30, an RE detector 34 for detecting an RE signal obtained by the pickup 30, an LD controller 36 for controlling a laser diode provided in the pickup 30, a memory 38 storing control parameters of the LD controller 36 and a threshold that will be described later, and so forth, a tracking controller 40 that controls tracking of the pickup 30 based on the result of detection by the servo detector 32, and a focus controller 42 that controls focusing of the pickup 30.

The components of the drive 20 are well known to those skilled in the art, so that detailed descriptions thereof will be omitted herein.

Among the components, the LD controller 36 and the memory 38 particularly relate to testing of recording quality, which constitutes a main feature of this embodiment. The LD controller 36 outputs a parameter for a laser beam for irradiating the medium 16 therewith, i.e., recording pulses, to the pickup 30, thereby controlling recording condition. The memory 38 stores a pattern of recording pulses and other parameters.

Figure 2:
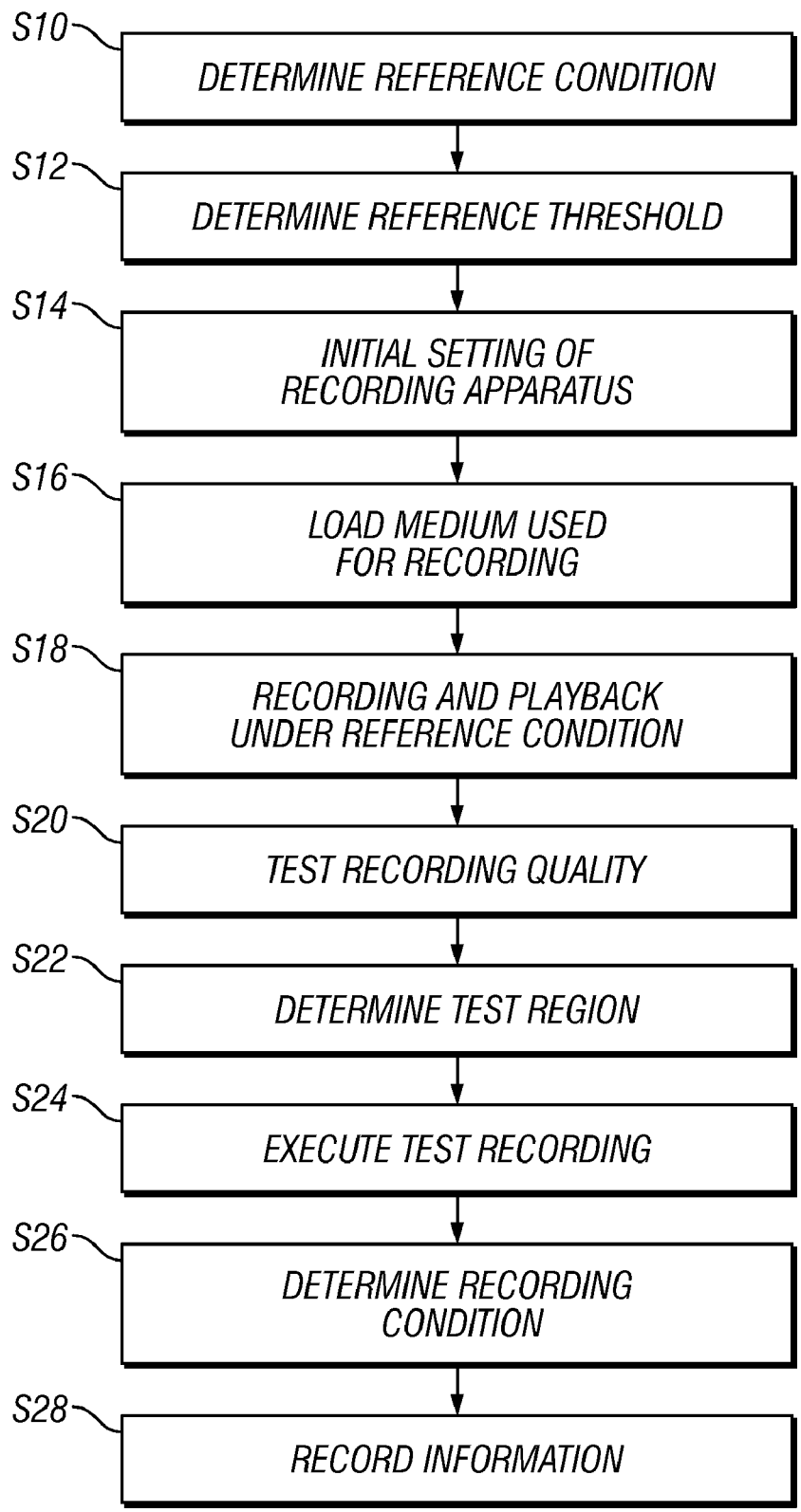
FIG. 2 is a flowchart showing a procedure that is executed by a drive according to the embodiment.

FIG. 2 is a flowchart showing a procedure that is executed by the drive 20 according to this embodiment. Referring to FIG. 2, the drive 20 executes steps S10 to S14 to make initial setting of the drive 20. Then, the drive 20 executes steps S16 to S22 to determine a condition for test recording. Then, the drive 20 executes step S24 to execute test recording under the condition determined. Then, the drive 20 executes step S26 to determine a condition for actual recording based on the result of the test recording. Then, the drive 20 executes step S28 to record information on the medium 16 under the condition determined. Now, these steps will be described in more detail.

Determining Reference Condition

In step S10 shown in FIG. 2, test recording is carried out while varying recording speed using a standard medium, thereby obtaining one pulse width and three power values as a reference condition. Preferably, the three power values are a power value that minimizes jitter as a result of the test recording, and two power values above and below that power value. Preferably, the two power values are values in the vicinity of a threshold that serves as a reference for determining a result of jitter test. These reference conditions are used for later testing of recording quality.

Determining Reference Threshold

As will be described later, it is supposed in this embodiment that a region where the jitter threshold is not exceeded is set as a range of test recording condition (hereinafter referred to as a "test region"), so that the jitter threshold that serves as a reference must be determined. The threshold may be a standard value determined in advance in accordance with the type of the drive or medium. However, the threshold representing a minimum line of an allowable region of jitter varies depending on the status of the pickup 30 or other components shown in FIG. 1, and also varies depending on the recording speed for the medium.

Thus, preferably, the threshold is also determined on the basis of a combination of a drive and a medium that are actually used so that a more appropriate reference will be used and a more appropriate test region will be set.

It is to be noted, however, that setting a threshold on the basis of a combination of a drive and a medium causes an increase in the number of recording steps. Thus, alternatively, a threshold that is suitable for an individual drive may be stored in the memory 38 at the time of manufacturing, assuming that variation among individual drives is a main factor of variation in the threshold.

FIG. 3 is a flowchart showing details of the step of determining a reference threshold, shown in FIG. 2. Referring to FIG. 3, to determine a reference threshold, recording and playback are carried out based on a predetermined recording condition, a reference value for the system is determined based on the result, and a value obtained by setting a predetermined margin to the reference value is determined as a threshold that is used to determine a test region. Now, these steps will be described in order.

First, in step S50, a recording condition is set. In step S50, a predetermined number of patterns of conditions needed for recording and playback, such as a pulse width, power, recording and playback speed, and recording address, is prepared, and the recording conditions are set in the drive 20. Then, a reference medium is loaded in the drive 20. Preferably, a medium having standard characteristics among various media is chosen as the reference medium.

Then, in step S52, recording and playback are carried out with the reference medium loaded based on the recording conditions set in step S50, thereby obtaining recording and playback characteristic values under the respective recording conditions, such as jitter. A value representing recording quality is selected as the characteristic value to be obtained.

Then, in step S54, an optimal value, for example, a minimum value of jitter, is selected from the recording and playback characteristic values obtained in step S52. Here, a jitter value that is presumably approximate to the optimal value for the drive is set as a reference value. The reference value need not be an optimal point of jitter, and may be an intermediate point of two points crossing a predetermined threshold, i.e., an intermediate value of power margin.

Finally, in step S56, the system reference value determined in step S54 is multiplied by a predetermined coefficient $\alpha$ (preferably, $\alpha>1$) to calculate a threshold. Here, a predetermined margin is provided with respect to the system reference value. That is, the threshold is calculated by multiplying the system reference value by $\alpha$, where $\alpha$ is preferably about 1.5. The coefficient $\alpha$ is set suitably in accordance with the type of the drive or medium. The coefficient $\alpha$ may be set to 0.8 to 1.2 so that the threshold will be close to the system reference value, or to 2.0 to 3.0 so that the threshold will be larger.

FIG. 4 is a schematic diagram showing an example relating to the flow shown in FIG. 3. In the example shown in FIG. 4, a jitter value is used as a characteristic value representing recording quality, and the value of power is varied from P1 to P6 for each of pulse widths W1 to W4 to obtain playback characteristics 102-1 to 102-4. In the example shown in FIG. 4, the pulse widths W1 to W4 and the power P1 to P6 are used as recording conditions. The pole of the playback characteristics 102-3 that minimizes the jitter value is used as the system reference value, and a value obtained by multiplying the system reference value by, for example, 1.5 is used as a threshold. The arrows in the matrix image shown in FIG. 4 indicate directions of changing test conditions. This also applies to the subsequent figures.

Figure 5:
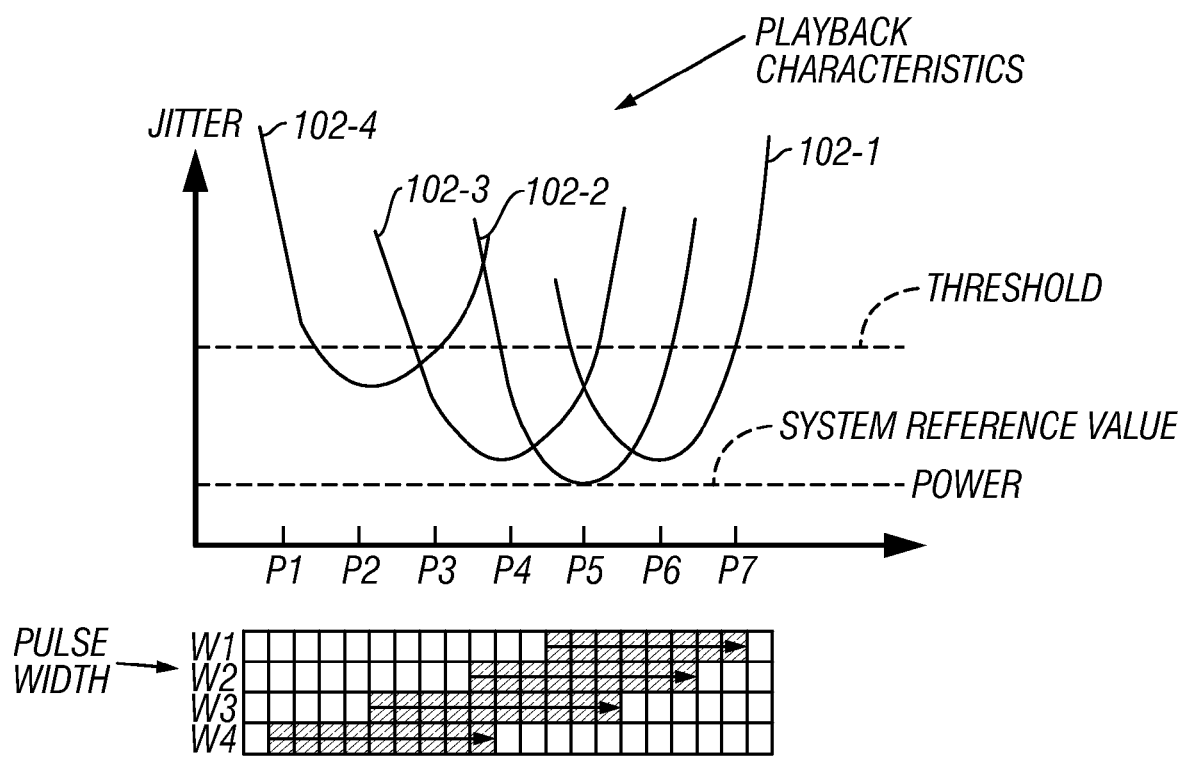
FIG. 5 is a schematic diagram showing an example relating to the flow shown in FIG. 3.

FIG. 5 is a schematic diagram showing an example relating to the flow shown in FIG. 3. In the example shown in FIG. 5, a jitter value is used as a characteristic value representing recording quality, and the range of variation in the power value is varied among the pulse widths W1 to W4 to obtain playback characteristics 102-1 to 102-4. In the example shown in FIG. 5, the pole of the playback characteristics 102-2 that minimizes the jitter value is used as the system reference value, and a value obtained by multiplying the system reference value by, for example, 1.5 is used as the threshold. As just described, a threshold may be determined while varying the power condition for each of the pulse widths.

Figure 6:
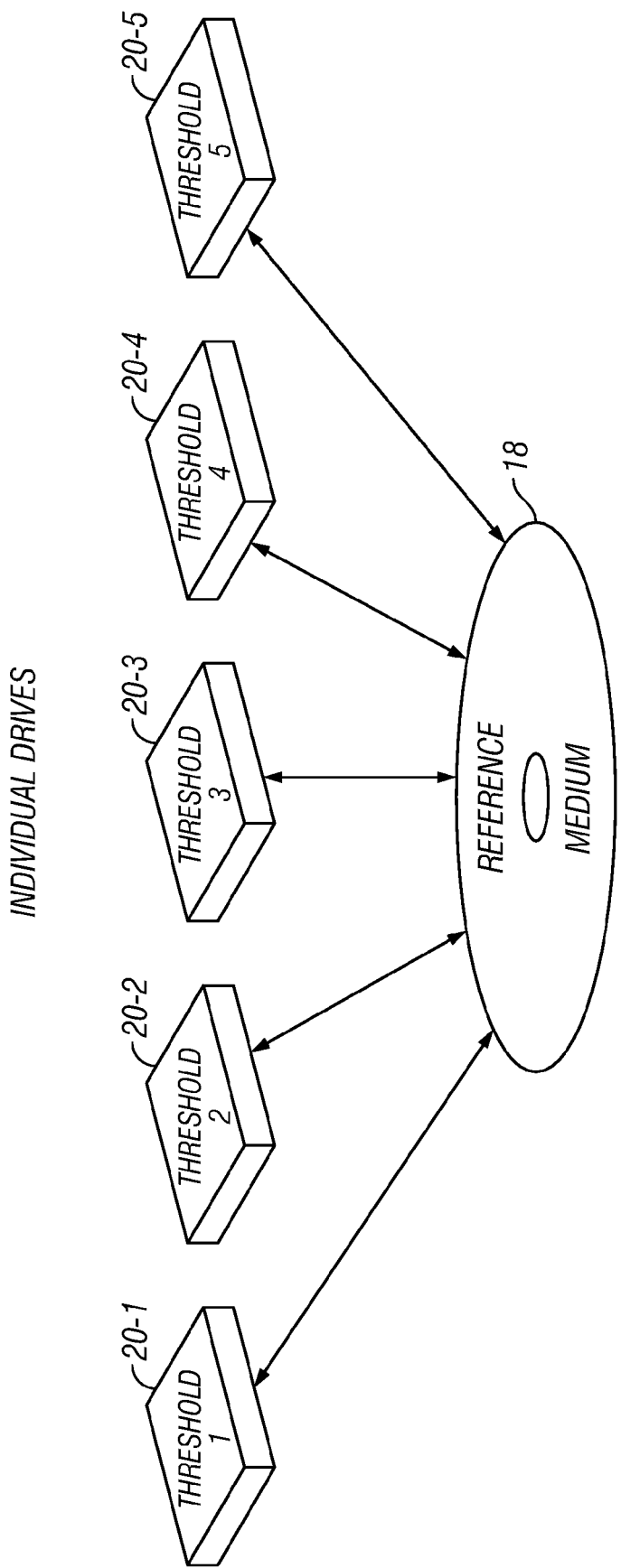
FIG. 6 is a schematic diagram showing an example where thresholds are calculated for individual drives.

FIG. 6 is a schematic diagram of an example where a threshold is calculated for each drive. When thresholds are preferred to be set in accordance with variation among individual drives, as shown in FIG. 6, recording and playback are carried out with a common reference medium 18 by drives 20-1 to 20-5, and thresholds 1 to 5 specific to the respective drives are stored.

Figure 7:
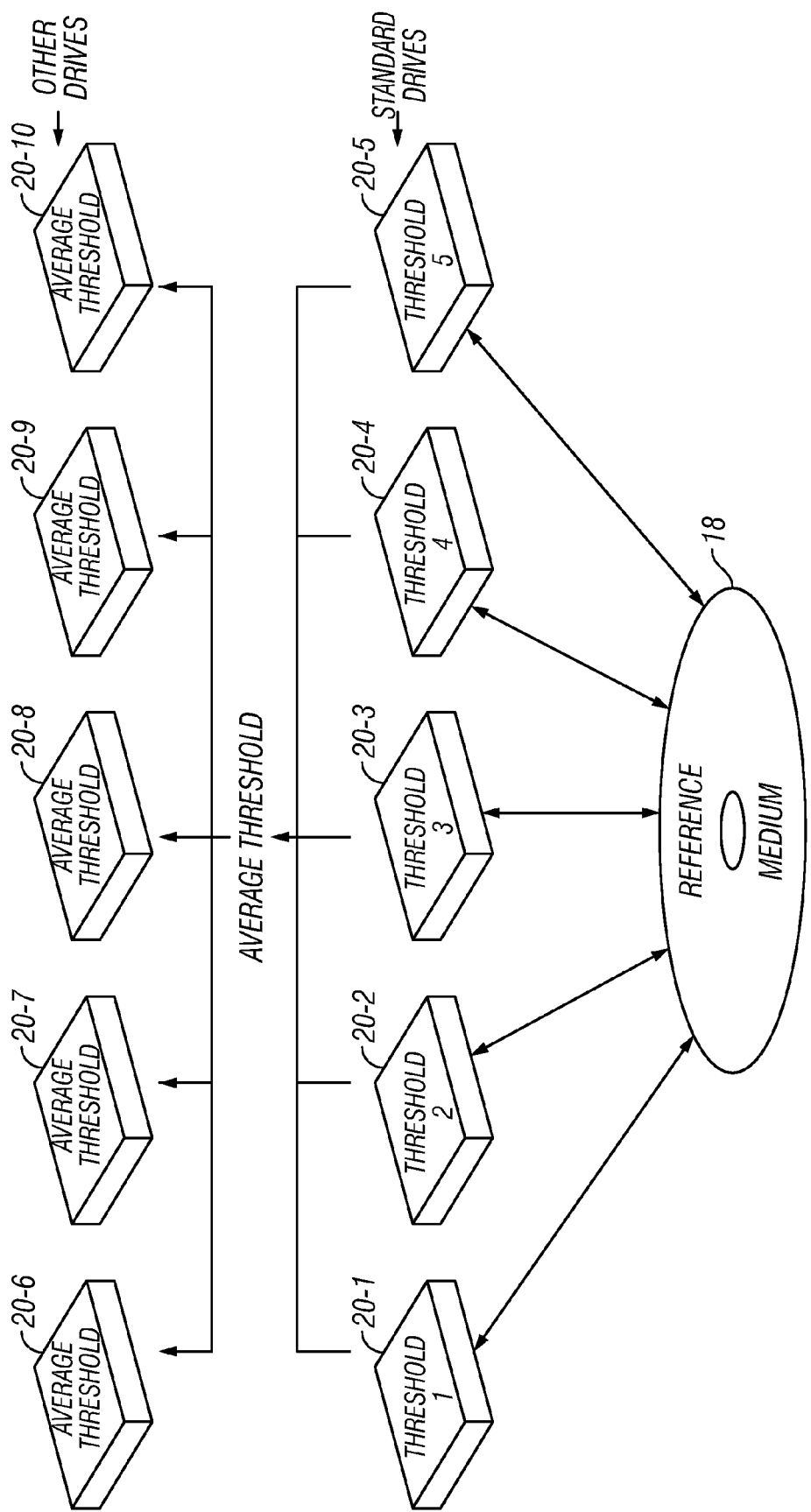
FIG. 7 is a schematic diagram showing an example where an average threshold obtained using a plurality of drives is set as thresholds of other drives.

FIG. 7 is a schematic diagram of an example where an average of thresholds calculated for several drives is used as thresholds for other drives. When it is desired to simplify steps of setting thresholds, as shown in FIG. 7, thresholds 1 to 5 are obtained by carrying out recording and playback with the common reference medium 18 using the standard drives 20-1 to 20-5, respectively, and taking an average of the thresholds 1 to 5. The average threshold is used as thresholds for other drives 20-6 to 20-10.

The drives 20-1 to 20-5 used to calculate an average threshold may be configured identically to each other, or similarly to each other. Furthermore, an average threshold may be used as thresholds for the drives 20-1 to 20-5. Furthermore, an average value once obtained may be used generally as thresholds for identically or similarly configured drives that are manufactured subsequently. Furthermore, it is possible to intentionally prepare a plurality of drives having variation and obtain an average threshold among the drives.

Initial Setting of Recording Apparatus

In step S14, the reference condition and the reference threshold obtained in steps S10 and S12 shown in FIG. 2 are stored in the memory 38 of the drive 20. Preferably, step S14 is executed at the time of manufacturing of the drive 20.

Loading of Recording Medium

Then, in step S16, the medium 16 for recording information thereon is loaded in the drive 20 where the initial setting has been completed in step S14.

Recording and Playback Under Reference Condition

Then, in step S18, recording is carried out on the medium 16 loaded in step S16, under the conditions set in step S14. More specifically, jitter values at three points are obtained by carrying out recording and playback three times using the single pulse width and three power values defined as reference conditions. The recording characteristics in relation to combinations of the drive 20 and the medium 16 can be understood by plotting the jitter values at the three points along a power axis.

Testing of Recording Quality

Figure 8A:
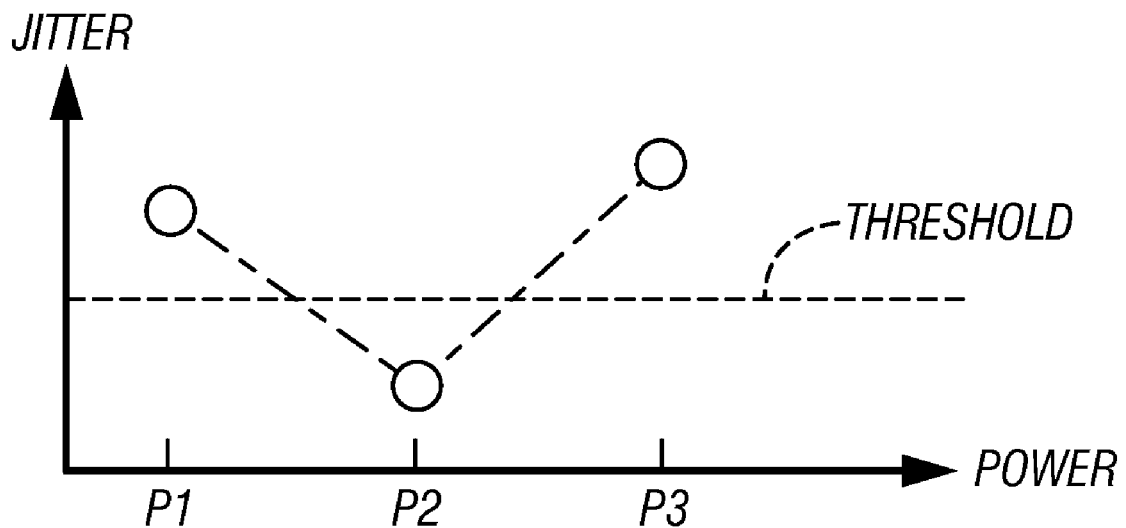
FIGS. 8A and 8B are schematic diagrams showing examples where valley patterns are obtained as results of testing recording characteristics in step S20 shown in FIG. 2.
Figure 8B:
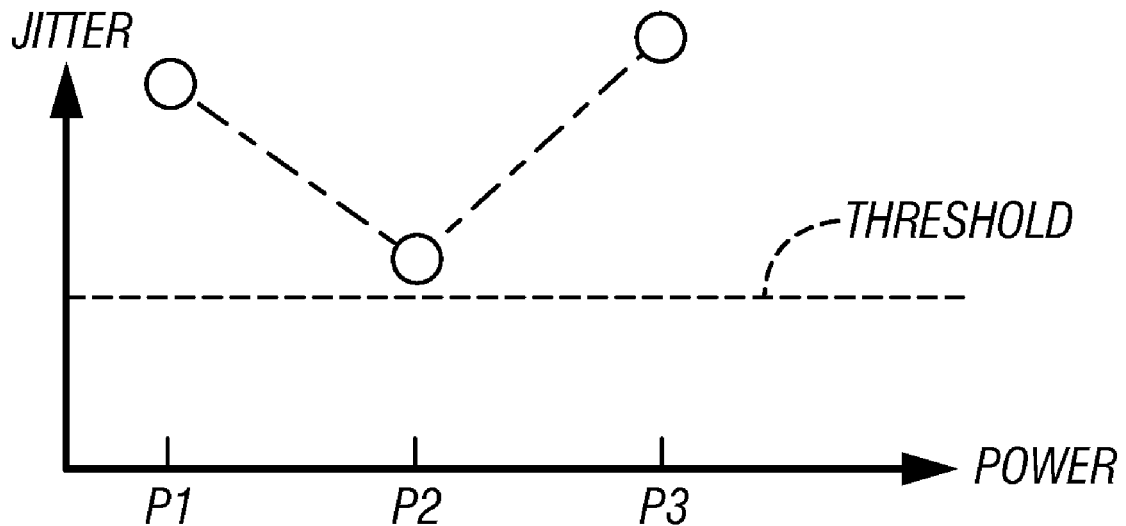

FIGS. 8A and 8B are schematic diagrams showing examples of valley patterns obtained as results of testing recording quality in step S20 shown in FIG. 2. As shown in FIGS. 8A and 8B, recording quality is tested using the jitter value and threshold for the respective reference conditions obtained in the preceding steps. In the examples shown in FIGS. 8A and 8B, power values P1, P2, and P3 are used as reference conditions, and a virtual line connecting jitter values obtained with the respective power values forms a valley pattern. When such a valley pattern is obtained, it is indicated that the reference medium used in step S10 and the recording medium loaded in step S16 have substantially the same sensitivity and similar recording characteristics.

FIG. 8A shows an example where the minimum value of the valley pattern is under the threshold than the threshold, and FIG. 8B shows an example where the minimum value of the valley pattern is not smaller than the threshold. Presumably, the reference medium and the recording medium have the same sensitivity in either case. When the reference medium and the recording medium have substantially the same sensitivity, a condition used for test recording is set by a surface area defined by power×pulse width and centered around the reference condition, as will be described later.

In FIGS. 8A and 8B, the difference between a playback value and a playback reference value obtained at each of the recording points P1, P2, and P3, i.e., the difference between the jitter value and the jitter threshold in the examples shown in FIGS. 8A and 8B, differs, and the playback value being closer to the playback reference value in FIG. 8A than in FIG. 8B.

This indicates that it is easier to find an optimal condition in the example shown in FIG. 8A than in the example shown in FIG. 8B. Thus, testing may be carried out a smaller number of times in the example shown in FIG. 8A than in the example shown in FIG. 8B, finding more optimal solution by a smaller number of tests.

That is, when the difference between the playback value and the playback reference value is small, the optimal condition becomes closer to the reference condition. On the other hand, when the difference between the playback value and the playback reference value is large, the optimal condition becomes remoter from the reference condition. Thus, when it is desired to decrease the number of times of testing, the number of times of testing is preferably varied in accordance with the difference between the playback value and the reference playback value.

Figure 9A:
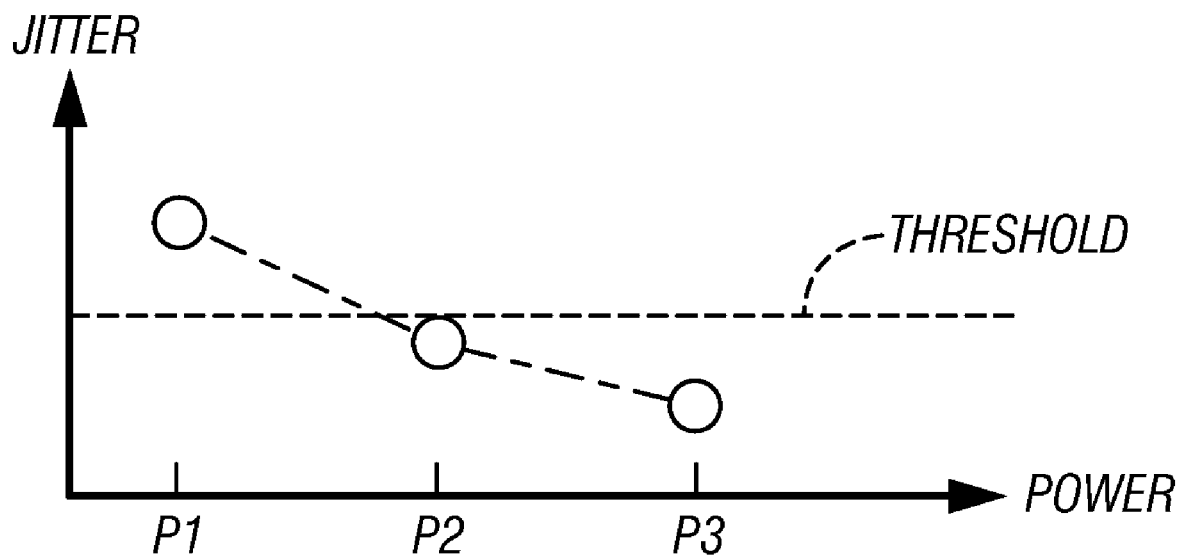
FIGS. 9A and 9B are schematic diagrams showing examples where right-decreasing patterns are obtained as results of testing recording characteristics in step S20 shown in FIG. 2.
Figure 9B:
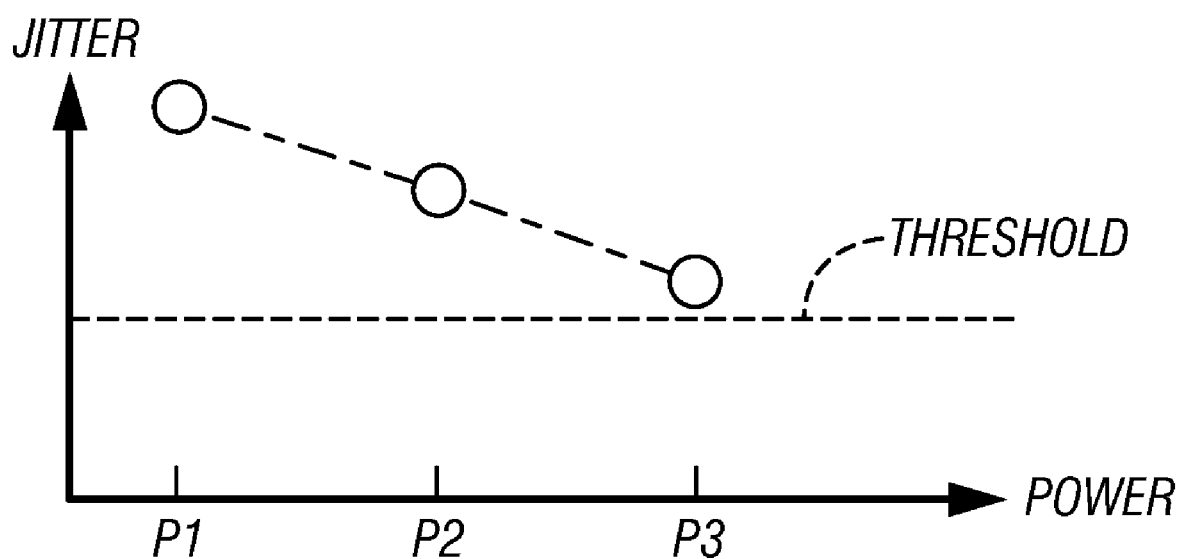

FIGS. 9A and 9B are schematic diagrams showing examples where right-decreasing patterns are obtained as results of testing recording quality in step S20 shown in FIG. 2. In the examples shown in FIGS. 9A and 9B, right-decreasing patterns are obtained, where the jitter value decreases as the power increases through P1, P2, and P3. When such a right-decreasing pattern is obtained, it is indicated that the sensitivity of the recording medium is lower than the sensitivity of the reference medium.

FIG. 9A shows an example where the minimum value of the right-decreasing pattern is not larger than the threshold, and FIG. 9B shows an example where the minimum value of the right-decreasing pattern is not smaller than the threshold. It is presumed that the sensitivity of the recording medium is lower than the sensitivity of the reference medium in either case. When the sensitivity of the recording medium is lower, a test region defined by a surface area of power×pulse width and centered around the reference condition is shifted to the side of high power and wide pulse width for test recording, as will be described later.

Furthermore, when such a right-decreasing pattern shown in FIGS. 9A and 9B is obtained, the minimum value of jitter presumably exists on the side of higher power, so that additional writing may be performed at a power higher than P3 to check recording characteristics again. In this case, although the number of times of recording increases by one, the precision of testing of recording quality is improved. When such a pattern is obtained, similarly to the case where a valley pattern is obtained, the number of times of testing may be varied in accordance with the difference between the playback value and the playback reference value.

Furthermore, when such a right-decreasing pattern shown in FIGS. 9A and 9B is obtained, presumably, the optimal solution becomes remoter from the reference condition than in the valley patterns shown in FIGS. 8A and 8B, so that the number of times of testing is preferably increased than in the case of the valley patterns.

Figure 10A:
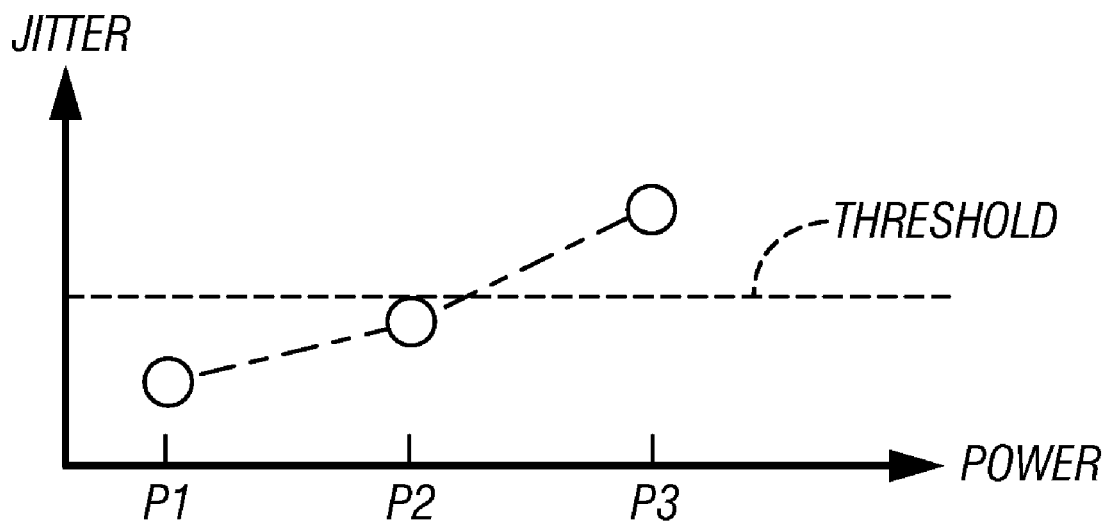
FIGS. 10A and 10B are schematic diagrams showing examples where right-increasing patterns are obtained as results of testing recording characteristics in step S20 shown in FIG. 2.
Figure 10B:
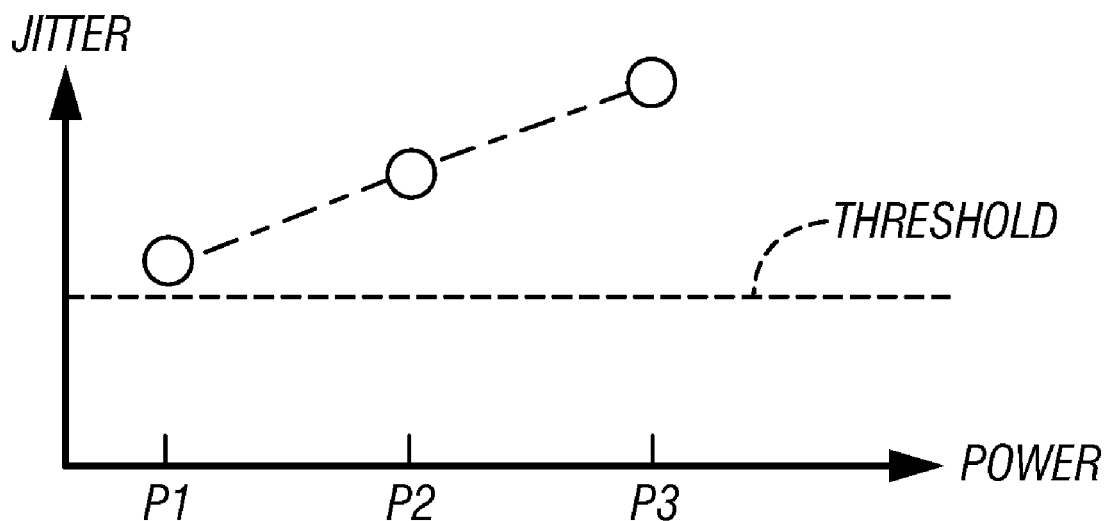

FIGS. 10A and 10B are schematic diagrams showing examples where right-increasing patterns are obtained as results of testing recording quality in step S20 shown in FIG. 2. In the examples shown in FIGS. 10A and 10B, right-increasing patterns are obtained where the jitter value increases as the power increases through P1, P2, and P3. When such right-increasing patterns are obtained, it is indicated that the sensitivity of the recording medium is higher than the sensitivity of the reference medium.

FIG. 10A shows an example where the minimum value of the right-increasing pattern is not larger than the threshold, and FIG. 10B shows an example where the minimum value of the right-increasing pattern is not smaller than the threshold. Presumably, the sensitivity of the recording medium is higher than the sensitivity of the reference medium in either case. When the sensitivity of the recording medium is higher, a test region defined by a surface area of power×pulse width and centered around the reference condition is shifted to the side of lower power and narrower pulse width for test recording, as will be described later.

Furthermore, when right-increasing patterns shown in FIGS. 10A and 10B are obtained, the minimum value of jitter presumably exists on the side of lower power, so that additional writing may be performed at a power lower than P1 to check recording characteristics again. In this case, although one additional recording is required, the precision of testing of recording quality is improved. When such patterns are obtained, similarly to the cases where the valley patterns are obtained, the number of times of testing may be varied in accordance with the difference between the playback value and the playback reference value.

Furthermore, when such right-increasing patterns shown in FIGS. 10A and 10B are obtained, presumably, the optimal solution becomes remoter from the reference condition than in the valley patterns shown in FIGS. 8A and 8B. Thus, preferably, the number of times of testing is increased compared with the case of the valley patterns.

Determining Test Region

Figure 11:
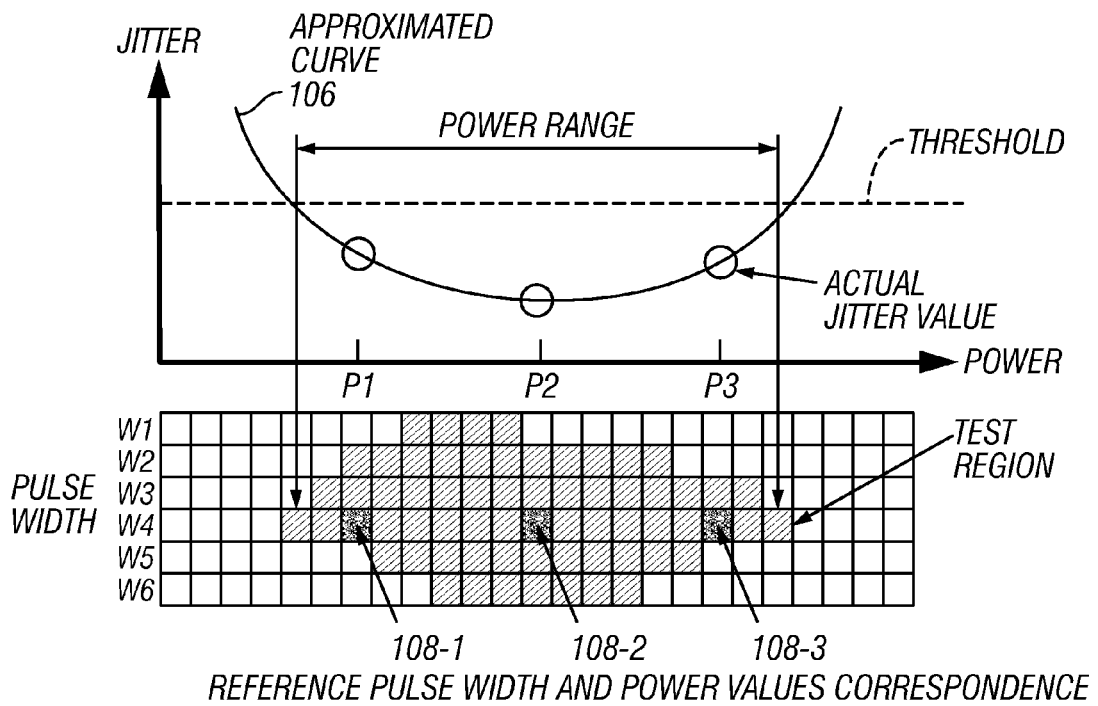
FIG. 11 is a schematic diagram showing an example where a test region determined in step S22 shown in FIG. 2 when a valley pattern is obtained in step S20.

FIG. 11 is a schematic diagram showing an example of determining a test region in step S22 when a valley pattern is obtained in step S20 shown in FIG. 2. As shown in FIG. 11, when a valley pattern is obtained, the power value for test recording is varied in a power range defined by intersecting points of the threshold and an approximated curve 106 drawn with jitter values obtained at P1, P2, and P3, respectively. In this embodiment, a "power range" is defined as a range of power that is actually used in test recording, and a "power margin" is defined as a range of power with which jitter does not exceed a threshold.

The approximated curve 106 differs depending on pulse width. Thus, denoting a pulse width used for the reference condition W4, recording is carried out at power values P1, P2, and P3 for each of the pulse widths W1 to W6 centered around W4. Intersecting points of the threshold are checked thereby and the approximated curve 106 is obtained. Thus, as represented in the matrix image shown in FIG. 11, a power range where jitter does not exceed the threshold is obtained for each of the pulse widths, and a hatched region shown in FIG. 11 is used as a test region. The three power conditions P1, P2, and P3 and the pulse width W4 correspond to 108-1, 108-2, and 108-3 in the matrix image shown in FIG. 11. The test region is set as a surface region defined by power×pulse width and centered around the reference condition.

By obtaining a power range for each pulse width as described above, a region where jitter does not exceed the threshold can be tested in a concentrated manner, so that a suitable condition can be found by a smaller number of times of testing.

The number of times of testing can also be reduced by setting a larger step size of variation in the power value when the power margin is large, or by setting a smaller step size of variation in the power value when the power margin is small. For example, when the power margin is 10 mW, assuming that rough testing suffices to obtain an optimal value, testing is carried out five times with a step size of 2 mW. When the power margin is 1 mW, assuming that more precise testing is needed, testing is carried out ten times with a step size of 0.1 mW.

Figure 12:
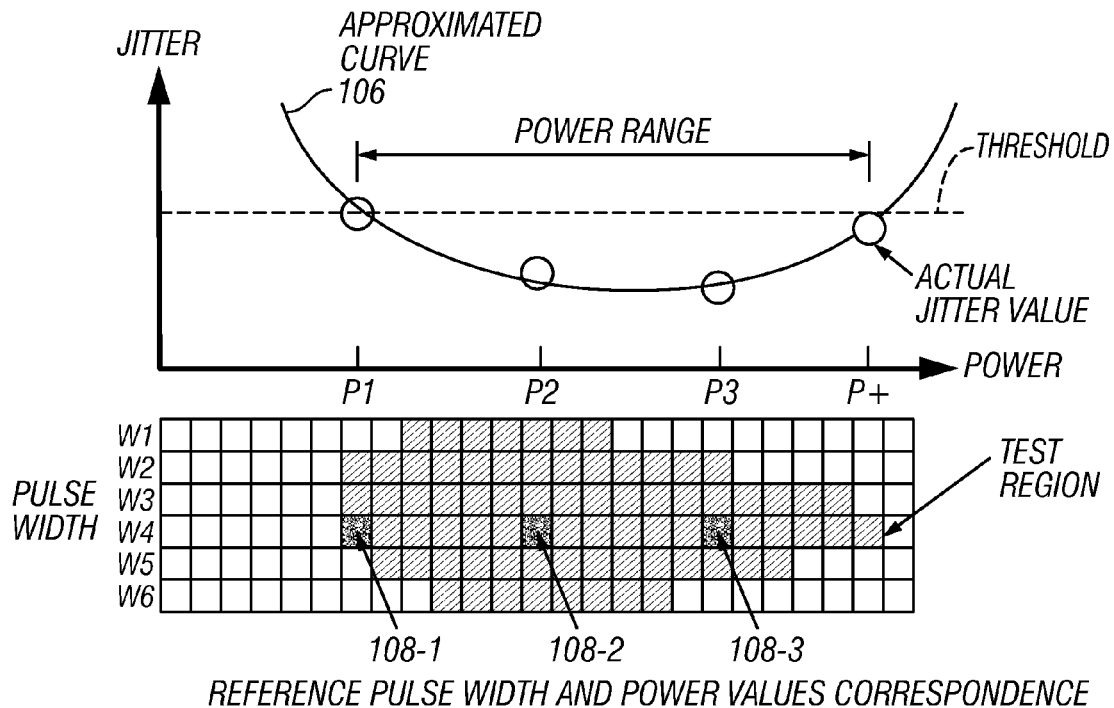
FIG. 12 is a schematic diagram showing an example where a test region determined in step S22 shown in FIG. 2 when a right-decreasing pattern is obtained in step S20.

FIG. 12 is a schematic diagram showing an example of determining a test region in step S22 when a right-decreasing pattern is obtained in step S20 shown in FIG. 2. When a right-decreasing pattern is obtained, it is presumed that an optimal parameter exists on the side of higher power, as shown in FIG. 12. Thus, additional recording is performed at a power value P+ that is higher than P3, and a range defined by intersecting points of the threshold and the approximated curve 106 drawn with jitter values obtained at P1, P2, P3, and P+, respectively, is used as a power range. This processing is carried out for each of the pulse widths W1 to W6, obtaining a test region represented in the matrix image shown in FIG. 12.

The test region determined by the procedure described above correspond to the surface region defined by power× pulse width being shifted to the side of higher power and centered around the reference conditions 108-1, 108-2, and 108-3. Although W1 to W6 used for the valley pattern are used in this example, W1 to W6 may be shifted to a larger pulse width region to determine a power range since a right-decreasing pattern indicates a lower sensitivity.

Figure 13:
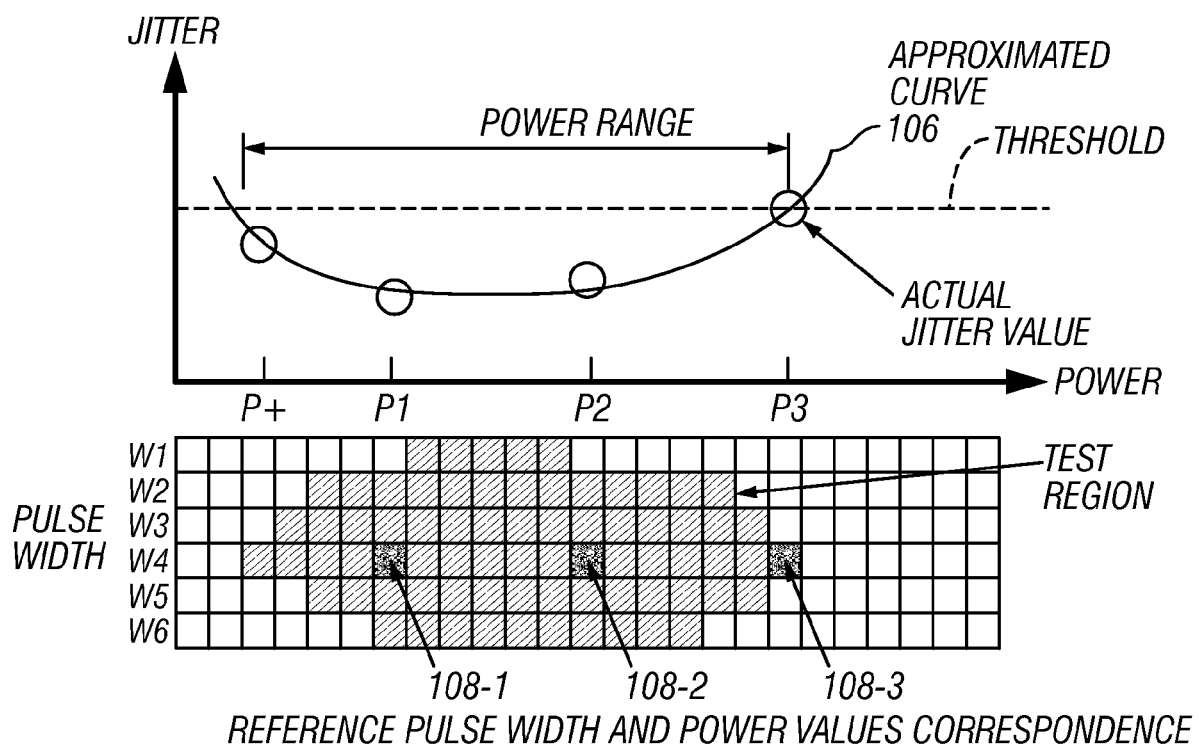
FIG. 13 is a schematic diagram showing an example where a test region determined in step S22 shown in FIG. 2 when a right-increasing pattern is obtained in step S20.

FIG. 13 is a schematic diagram showing an example of determining a test region in step S22 when a right-increasing pattern is obtained in step S20 shown in FIG. 2. When a right-increasing pattern is obtained, it is presumed that an optimal parameter exists on the side of lower power, as shown in FIG. 13. Thus, additional recording is performed at a power value P+ that is lower than P1, and a power range is defined by intersecting points of the threshold and the approximated curve 106 drawn with jitter values obtained at P+, P1, P2, and P3, respectively. This processing is carried out for each of the pulse widths W1 to W6, obtaining a test region represented in the matrix image shown in FIG. 13.

The test region determined by the procedure described above corresponds to the surface region defined by power× pulse width being shifted to the side of higher power and centered around the reference conditions 108-1, 108-2, and 108-3. Although W1 to W6 used for the valley pattern are used in this example, W1 to W6 may be shifted to a narrower pulse width range to determine a power range since a right-increasing pattern indicates a higher sensitivity.

That is, according to the method described above, recording quality is tested for each pulse width, and the number of times of testing is determined for each pulse width according to results of the testing. Thus, the number of times of testing can be reduced. The testing of recording quality, described above, is an example where change in jitter is patterned by recording at the reference condition. Preferably, the following eight patterns are used.

FIG. 14 is a diagram showing an example of performing step S20 shown in FIG. 2 using eight patterns. Referring to FIG. 14, The pattern 1 is applied when the maximum value of jitter does not exceed the threshold, regardless of whether the pattern is a valley, right-increasing, or right-decreasing. When this pattern is obtained, it is considered that the sensitivity of the recording medium is substantially the same as the sensitivity of the reference medium and that a large margin where the jitter value does not exceed the threshold is provided, so that the power condition is extended on both lower power side and higher power side. That is, with the pattern 1, since values in the vicinity of the threshold are not obtained, additional recording is carried out on both the lower power side and the higher power side.

Then, jitter characteristics obtained by the additional recording are approximated by a curve, and the range between two values, large and small, at which the curve intersect with the jitter threshold is used as a reference value of power range.

Furthermore, when this pattern is obtained, a pulse width region of the reference value ±0.2T is determined as a test region. In test recording, an optimal recording condition is determined by varying the pulse width by a step size of 0.2T. T denotes the length of a time unit of a recording pit.

Here, assume that the reference pulse width is a pulse condition 1, and the extended two points are pulse conditions 2 and 3, the pulse conditions 2 and 3 for the pattern 1 are pulse widths extended by ±0.2T. In accordance with the change in the pulse width condition, the power range used as a test condition is also adjusted.

More specifically, when the pulse width is changed by 0.1T, the power range for the pulse width is defined as the reference value of power range×(1−0.05×1) mW. When the pulse width is changed by 0.2T, the power range for the pulse width is defined as the reference value of power range×(1−0.05×2) mW. When the pulse width is changed by −0.1T, the power range for the pulse width is defined as the reference value of power range×(1−0.05×(−1)) mW.

Thus, the following three patterns of test conditions are used for the pattern 1.

(1) Reference value of pulse width, and reference value of power range (2) Reference value of pulse width −0.2T, and reference value of power range×(1−0.05×(−2)) mW (3) Reference value of pulse width +0.2T, and reference value of power range×(1−0.05×(+2)) mW In this embodiment, the reference condition (1) need not be used in actual test recording.

The pattern 2 is applied when a valley pattern is obtained and the minimum value of jitter does not exceed the threshold. When this pattern is obtained, it is considered that the sensitivity of the medium on which data is to be recorded and the sensitivity of the reference medium are substantially the same, so that reference value ±0.1T is selected as a pulse width condition. Then, a power range is set for each of these pulse conditions by the same procedure used for the pattern 1. Thus, the following three patterns of test conditions are used for the pattern 2.

(1) Reference value of pulse width, and reference value of power range (2) Reference value of pulse width −0.1T, reference value of power range×(1−0.05×(−1)) mW (3) Reference value of pulse width +0.1T, reference value of power range×(1−0.05×(+1)) mW The pattern 3 is applied when a valley pattern is obtained and the minimum value of jitter exceeds the threshold. When this pattern is obtained, it is considered that the sensitivity of the medium on which data is to be recorded is substantially the same as the sensitivity of the reference media, and that difference in the characteristics of medium is large, so that reference value ±0.2T is selected as a pulse width condition. Then, a power range is set for each of these pulse conditions by the same procedure as for the pattern 1. Thus, the following three patterns of test conditions are used for the pattern 3.

(1) Reference value of pulse width, and reference value of power range (2) Reference value of pulse width −0.2T, and reference value of power range×(1−0.05×(−2)) mW (3) Reference value of pulse width +0.2T, and reference value of power range×(1−0.05×(+2)) mW The pattern 4 is applied when a right-decreasing pattern is obtained and the minimum value of jitter does not exceed the threshold. When this pattern is obtained, it is considered that the sensitivity of the recording medium is slightly lower than the sensitivity of the reference medium, so that three points, the reference value, +0.1T, and +0.2T, are selected as pulse width conditions. Then, a power range is set for each of these pulse conditions by the same procedure used for the pattern 1. Thus, the following three patterns of test conditions are used for the pattern 4.

(1) Reference value of pulse width, and reference value of power range (2) Reference value of pulse width +0.1T, and reference value of power range×(1−0.05×(+1)) mW (3) Reference value of pulse width +0.2T, and reference value of power range×(1−0.05×(+2)) mW The pattern 5 is applied when a right-decreasing pattern is obtained and the minimum value of jitter exceeds the threshold. When this pattern is obtained, it is considered that the sensitivity of the recording medium is significantly lower than the sensitivity of the reference medium, so that three points, the reference value, +0.2T, and +0.4T, are selected as pulse width conditions. Then, a power range is set for each of these pulse conditions. Thus, the following three patterns of test conditions are used for the pattern 5.

(1) Reference value of pulse width, and reference value of power range (2) Reference value of pulse width +0.2T, and reference value of power range×(1−0.05×(+2)) mW (3) Reference value of pulse width +0.4T, and reference value of power range×(1−0.05×(+4)) mW The pattern 6 is applied when a right-increasing pattern is obtained and the minimum value of jitter does not exceed the threshold. When this pattern is obtained, it is considered that the sensitivity of the recording medium is slightly higher than the sensitivity of the reference medium, so that three points, the reference value, −0.1T, and −0.2T, are selected as pulse width conditions. Then, a power range is set for each of these pulse conditions by the same procedure used for the pattern 1. Thus, the following three patterns of test conditions are used for the pattern 6.

(1) Reference value of pulse width, and reference value of power range (2) Reference value of pulse width −0.1T, and reference value of power range×(1−0.05×(−1)) mW (3) Reference value of pulse width −0.2T, and reference value of power range×(1−0.05×(−2)) mW The pattern 7 is applied when a right-increasing pattern is obtained and the minimum value of jitter exceeds the threshold. When this pattern is obtained, it is considered that the sensitivity of the recording medium is significantly larger than the sensitivity of the reference medium, so that three points, the reference value, −0.2T, and −0.4T, are selected as pulse width conditions. Then, a power range is set for each of these pulse width conditions by the same procedure used for the pattern 1. Thus, the following three patterns of test conditions are used for the pattern 7.

(1) Reference value of pulse width, and reference value of power range (2) Reference value of pulse width −0.2T, and reference value of power range×(1−0.05×(−2)) mW (3) Reference value of pulse width −0.4T, and reference value of power range×(1−0.05×(−4)) mW The pattern 8 is applied when a mountain pattern is obtained and the maximum value of jitter exceeds the threshold. When this pattern is obtained, it is considered that the pattern is abnormal, so that the reference value ±0.2T are selected as pulse-width conditions. Then, a power range is set for each of these pulse width conditions by the same procedure used for the pattern 1. Thus, the following three patterns of test conditions are used for the pattern 8.

(1) Reference value of pulse width, and reference value of power range (2) Reference value of pulse width −0.2T, and reference value of power range×(1−0.05×(−2)) mW (3) Reference value of pulse width +0.2T, and reference value of power range×(1−0.05×(+2)) mW Of the eight patterns described above, when patterns other than the pattern 2, which is most approximate to the reference medium, are detected, and the recording result that has caused the pattern may be played back again to detect jitter in order to confirm that the pattern detected is not due to an incorrect playback operation. In this case, when characteristics other than the pattern 2 are detected, recording conditions are added or extended according to the conditions shown in FIG. 14.

When the pattern 8 is detected by the confirmation of an incorrect playback operation, it may be due to an incorrect recording operation. Thus, recording is performed again at the reference value of pulse width before performing additional recording and extending pulse width. When the pattern 8 is again obtained by the recording, additional recording, i.e., extending power to measure a margin for the pulse condition 1, may not be carried out, and pulse conditions 2 and 3 are extended. The power value is extended in accordance with the extension of the pulse conditions 2 and 3 by the method described earlier.

That is, in the case of the pattern 8, a margin is not provided with the pulse condition 1 and a power range serves as a reference for extension is not obtained, so that an initial power condition range is set as a reference power range.

Determining Test Region: Determining Power Range by Approximation

By executing the procedure described above, a test region that is effective for obtaining an optimal solution with a small number of times of testing is determined. A method of determining a power range is described below, which is important in determining a test region, will be described.

In this embodiment, in order to improve the accuracy of finding an optimal solution by a smaller number of times of testing, test conditions are concentrated to a region where the jitter value does not exceed the threshold, as described earlier. According to this scheme, a power range that is used in test recording is calculated from power values at large and small points defining a margin with respect to the threshold. The margin with respect to the threshold refers to a region where characteristic values not exceeding the threshold are obtained. The power values at large and small points refer to a value on the lower power side and a value on the higher power side defining the width of the margin.

Considering the reduction in test recording time of various media and the efficiency of test region of a medium with restriction on a test recording region, such as a write-once medium, the number of recording points needed for test recording should preferably be minimized. However, since the power range to be obtained here is an important parameter that serves as a criterion for determining an optimal recording condition, a high precision is desired.

A precise determination of a power range means concentrated testing of a selected region, so that it contributes to a reduction in the number of times of testing. For example, when test recording is performed at a frequency of once per 0.1 mW, test recording is performed ten times when the power range is 1 mW, and test recording is performed twenty times when the power range is 2 mW. Thus, narrowing the power range contributes to a reduction in the number of times of testing.

Thus, in this embodiment, considering that the recording quality of recording and playback signals changes like a quadratic curve with a pole at an optimal point with respect to recording power, characteristic curve is approximated using several recording points to determine an amount of margin. By using such an approximation method, it is possible to readily and precisely determine a power range based on several recording points, serving to reduce the number of times of testing.

Figure 15:
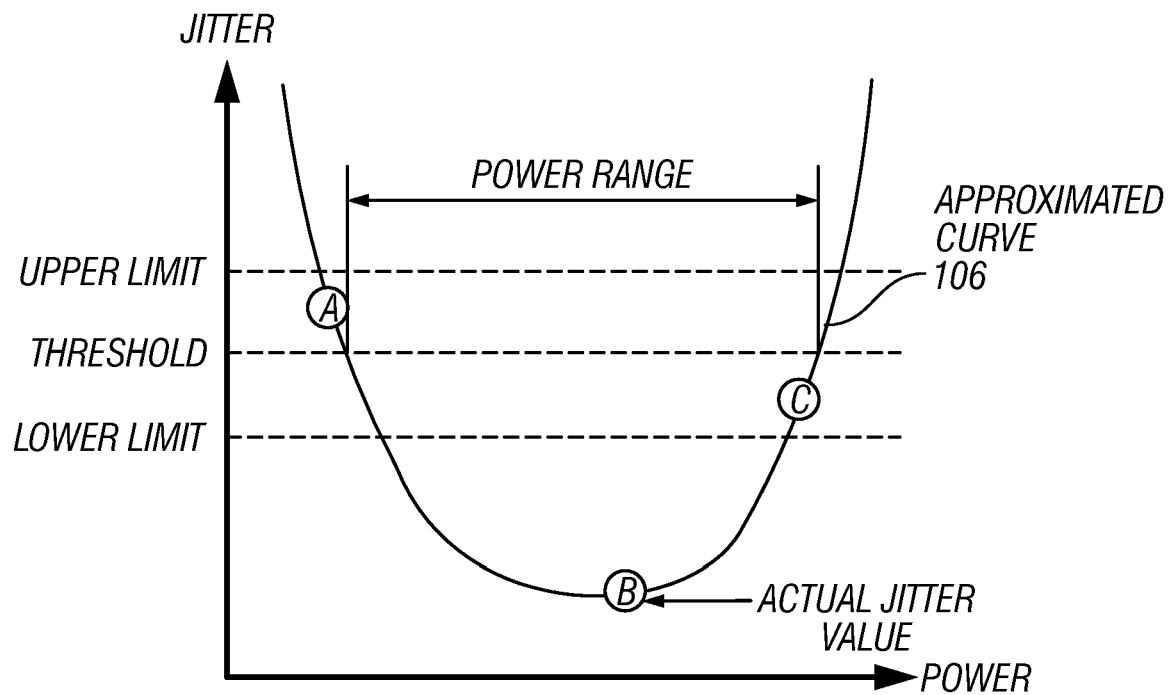
FIG. 15 is a schematic diagram showing an example method of obtaining a power range used in step S22 shown in FIG. 2 by curve approximation.

FIG. 15 is a schematic diagram for explaining a method of obtaining a power range used in step S22 shown in FIG. 2 by curve approximation. As shown in FIG. 15, to carry out approximation, first, two points a and c on the lower power side and the higher power side, respectively, at which the jitter value that serves as a criterion for determining recording characteristics is in the vicinity of the threshold, and a point b between the points a and c, at which the jitter value is smaller than the threshold and the values at the points a and c, are selected. That is, the points a, b, and c have the following relationship.

$$a>b, c>b, \text{threshold}>b$$

As shown in FIG. 15, the vicinity of the threshold is defined as a range between an upper limit and a lower limit having a certain width with respect to the threshold. Preferably, the upper limit is set to 40% of the threshold, and the lower limit is set to 5% of the threshold. Then, the values of a, b, and c are approximated by a quadratic function, and a power range is defined by the difference between large and small points where the quadratic curve intersects with the threshold. The range that is defined as the vicinity of the threshold may be changed suitably in consideration of the interval of recording points, for example, to −5% to +40% or −10% to 30%.

Figure 16:
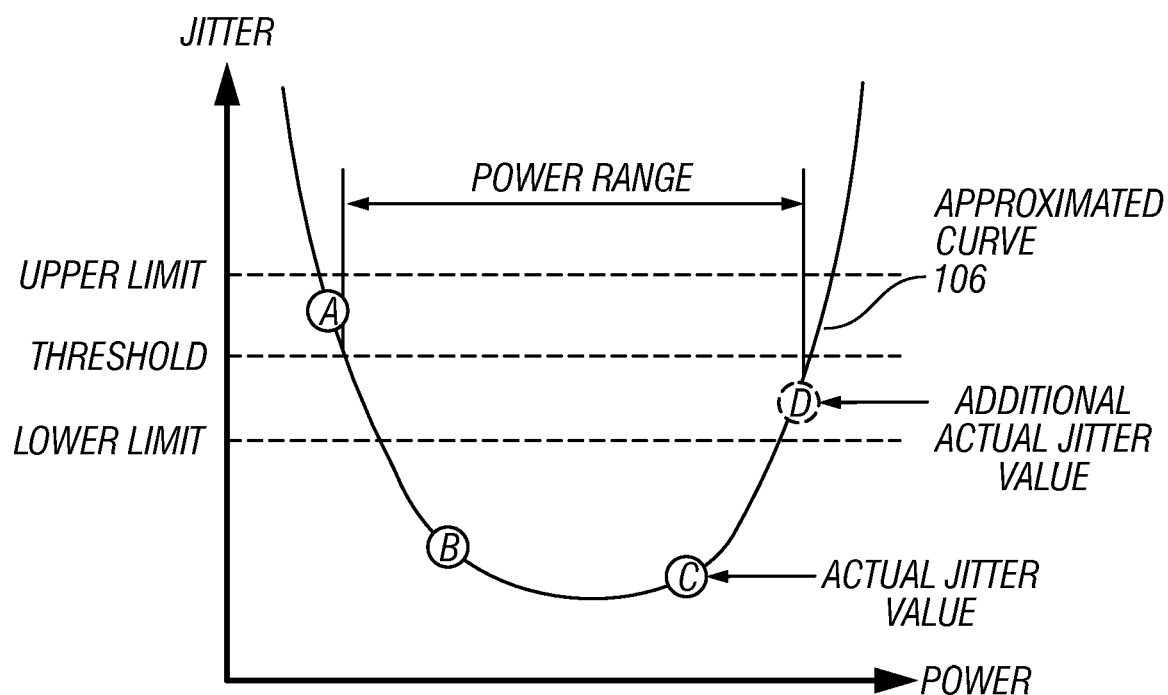
FIG. 16 is a schematic diagram showing another example method of obtaining a power range used in step S22 shown in FIG. 2 by curve approximation.

FIG. 16 is a schematic diagram for explaining another example where a power range used in step S22 shown in FIG. 2 is obtained by a curve approximation. As shown in FIG. 16, when a relationship satisfying a>b, c>b, and threshold>b is not obtained with the three conditions A, B, and C alone, preferably, D at the higher power side is added to obtain a value in the vicinity of the threshold.

Furthermore, as shown in FIG. 16, when a relationship of B>C exists, preferably, an approximate equation is calculated with three points A, C, and D without using B.

The relationship between the three recording points and the threshold in this case is A>C, D>C, and threshold>C, which is suitable for drawing an approximated curve, so that a precise approximated curve is obtained by three-point approximation. The additional recording condition indicated by D is determined according to A>B, B>C, and the threshold indicated by recording points before the addition.

In contrast with FIG. 15, when a value in the vicinity of the threshold is absent on the low power side, additional recording is performed at a power condition lower than A. Depending on the relationship between the recording points and the threshold, one or more recording conditions may be added.

Furthermore, the range of power for additional recording conditions may be constantly varied by a predetermined power step size, or power conditions may be set based on relationship between power variation and jitter variation obtained in advance.

When recording points sufficient to obtain a power range are not obtained even after adding recording conditions as described above, recording points are changed by adding recording conditions again by the same procedure described above.

Furthermore, in a case of medium whose test recording region is restricted, such as a write-once medium, or in order to avoid using an enormous testing time, an upper limit may be set to the number of times recording conditions are added. Furthermore, an upper limit of power for additional recording may be set so that recording power will not exceed a laser output value by adding recording conditions.

Furthermore, although a power range is determined by three-point approximation in the example described above, alternatively, a power range may be determined based on the difference between power values at large and small points that are most approximate to the threshold.

Alternatively, two points in the vicinity of the threshold may be selected by performing recording while changing power until large and small points across the threshold are found, and two points that are most approximate to the threshold may be selected, or the two points themselves may be selected. The methods will be described below in more detail.

Determining Test Region: Determining Power Range by Sampling

Figure 17:
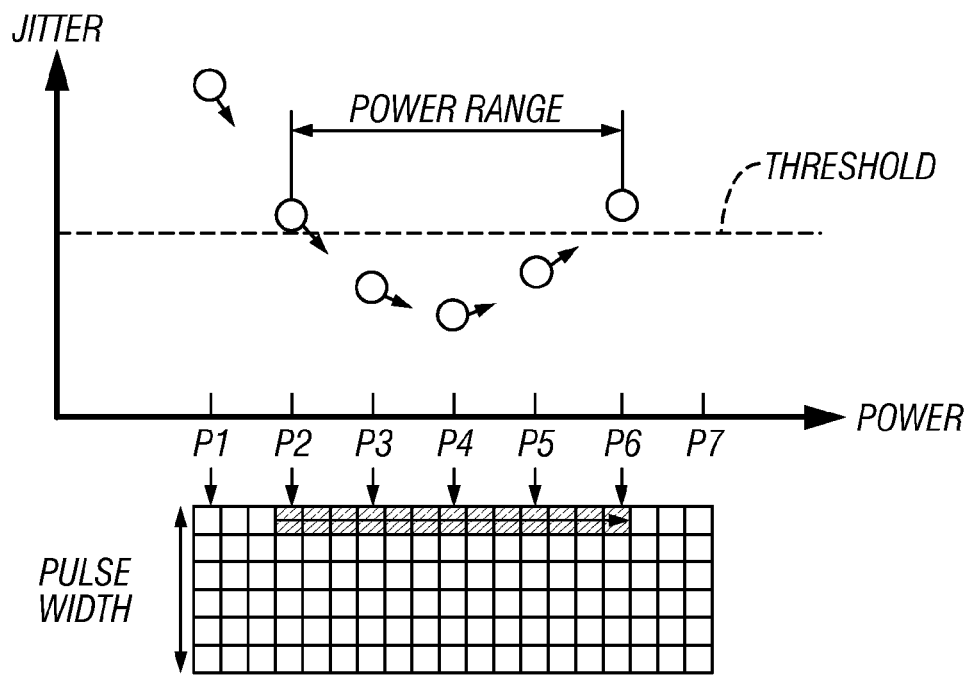
FIG. 17 is a schematic diagram showing an example where a power range used in step S22 shown in FIG. 2 is determined by sampling.

FIG. 17 is a schematic diagram showing an example where a power range used in step S22 shown in FIG. 2 is determined by sampling. In the example shown in FIG. 17, instead of the three-point approximation described earlier, power is gradually changed until values approximate to the threshold is obtained. A power range is determined based on power values at large and small points in the vicinity of the threshold.

More specifically, as shown in FIG. 17, recording power is increased sequentially as P1, P2, P3, . . . to carry out recording and playback until a power value P6 at which a value larger than the threshold is obtained. As shown in a matrix image in FIG. 17, power is changed over P1 to P6, and a power range is set between P2 on the low power side and P6 on the high power side that are most approximate to the threshold. As just above, a power range can be determined by selecting two points that cross the threshold.

A method for selecting large and small points in the vicinity of the threshold can be selected from the following accordingly.

1) Select large and small points defining a power margin. That is, select two points that are most approximate to a playback reference value within a power range satisfying the playback reference value.

2) Select two points that are most approximate to a playback reference value although being slightly outside of a power margin.

3) Select two points crossing a playback reference value on the low power side.

4) Select two points crossing a playback reference value on the high power side.

5) Select two points that are most approximate to a playback reference value and that are located across the playback reference value on the low power side and the high power side.

It is also possible to approximate recording characteristics using two points selected by one of the above methods, to determine large and small points that cross the playback reference value.

Test Recording

Figure 18A:
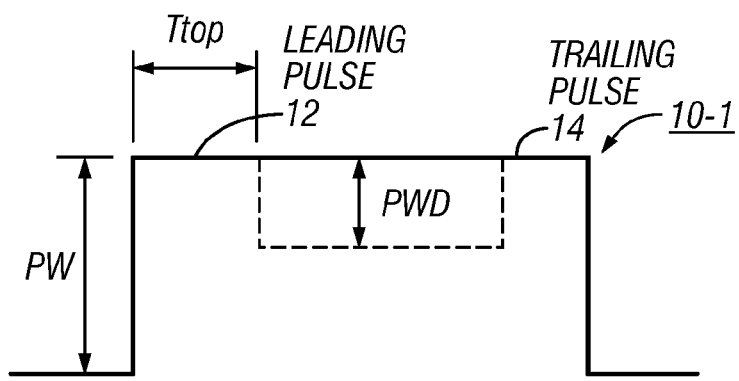
FIGS. 18A and 18B are schematic diagrams showing examples of pulse patterns used in test recording in step S24 shown in FIG. 2.
Figure 18B:
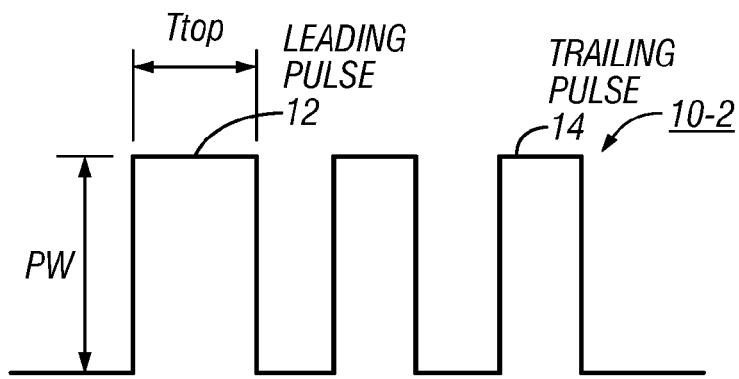

FIGS. 18A and 18B are schematic diagrams showing examples of pulse pattern used in test recording in step S24 shown in FIG. 2. FIG. 18A shows an example where a single pulse pattern is used. FIG. 18B shows an example where a multiple-pulse pattern is used. As shown in FIGS. 18A and 18B, each of a single-pulse pattern 10-1 and a multiple-pulse pattern 10-2 include a leading pulse 12 at the beginning of the pattern and a trailing pulse 14 at the end of the pattern. The amount of energy of the entire recording pulse is defined by the height of main power PW, and the amount of energy at the first stage applied to an edge of a recording pit is defined by the length of the leading pulse width Ttop. PWD indicated by a dotted line is an area used for fine adjustment of the amount of energy, and will be described later.

Preferably, the main power PW has a highest value in the recording pulses 10-1 and 10-2. The leading pulse width Ttop has a width corresponding to a recording pit having a length of 3T. Since recording pulses having this width have the highest frequency of occurrence and has much effect on recording quality, preferably, the leading pulse width Ttop is varied in test recording.

As shown in FIGS. 18A and 18B, whether the single-pulse pattern or the multiple-pulse pattern is used, the value of test power determined by the preceding steps is used as the main power PW, and the width of the test pulse is used as the leading pulse width Ttop.

As described above, test recording is carried out with the medium loaded in step S16 shown in FIG. 2 while changing the main power PW and the leading pulse width Ttop stepwise, playback is carried out based on recording pits formed by the test recording to obtain a jitter value for each test condition.

Then, another test recording is carried out once more using a predetermined pattern of pits and lands to examine other factors such as mismatch between recording pulses and recording pits. Then, the series of test recording is finished.

Determination of Recording Condition

Through the test recording described above, values of the main power PW and the leading pulse width Ttop with which the jitter value is minimized, and parameters for adjusting other factors are determined, and these values are used as a recording condition suitable for the combination of the drive and the medium.

Figure 19A:
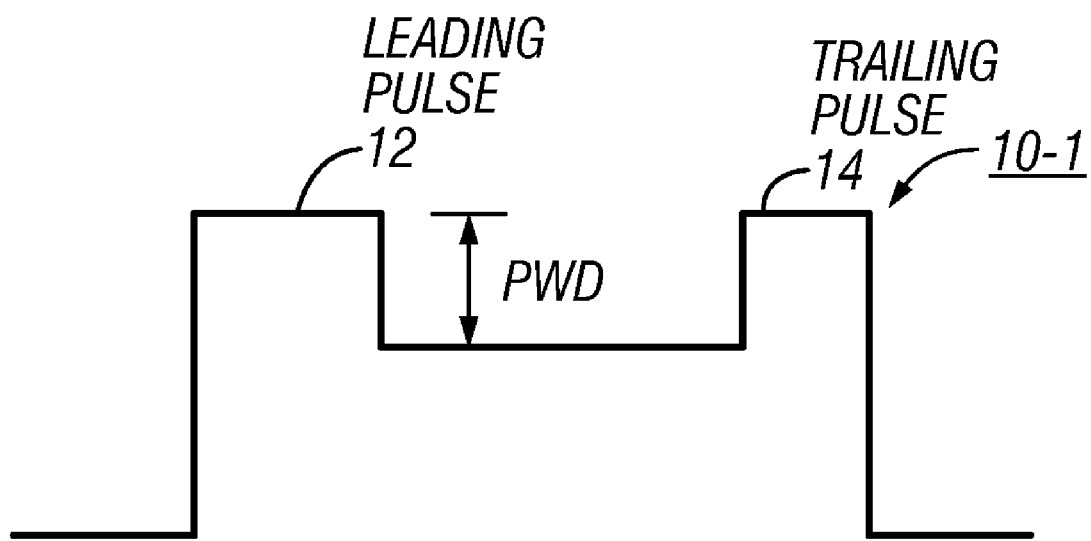
FIGS. 19A and 19B are schematic diagrams showing examples of other factors to be adjusted, determined in step S26 shown in FIG. 2.
Figure 19B:
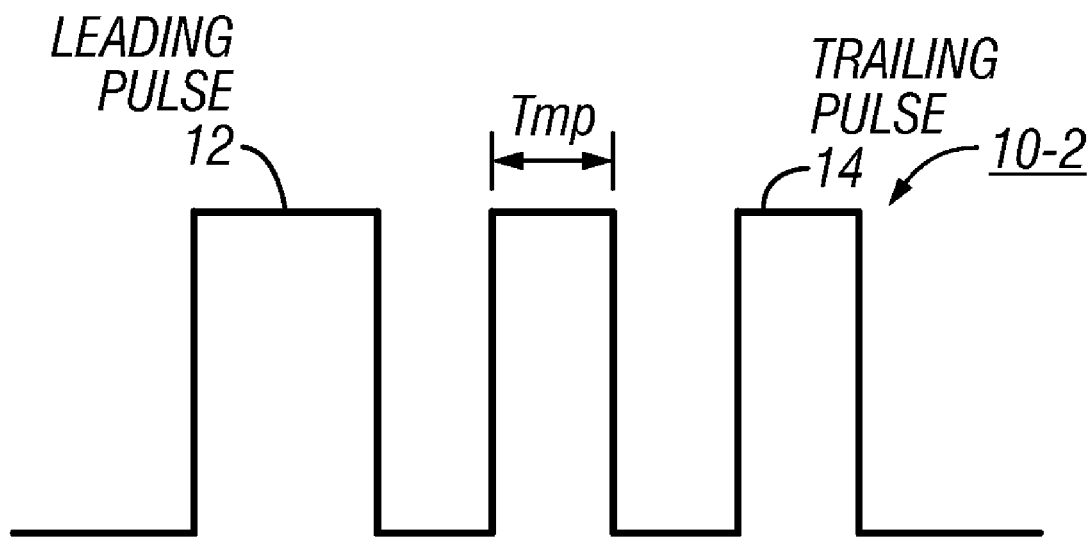

FIGS. 19A and 19B are schematic diagrams showing examples of adjustment of other factors determined in step S26 shown in FIG. 2. FIG. 19A shows an example where a single-pulse pattern is used. FIG. 19B shows an example where a multiple-pulse pattern is used.

As shown in FIG. 19A, in the case of the single-pulse pattern 10-1, a region of low power that is lower than the main power PW by PWD is provided between the leading pulse 12 and the trailing pulse 14 as another adjusting factor. By defining this amount, recording pits are prevented from forming a teardrop shape. Similarly, in the case of the multiple-pulse pattern 10-2, as shown in FIG. 19B, by defining the width Tmp of an intermediate pulse between the leading pulse 12 and the trailing pulse 14, recording pits are prevented from forming a teardrop shape.

Figure 20A:
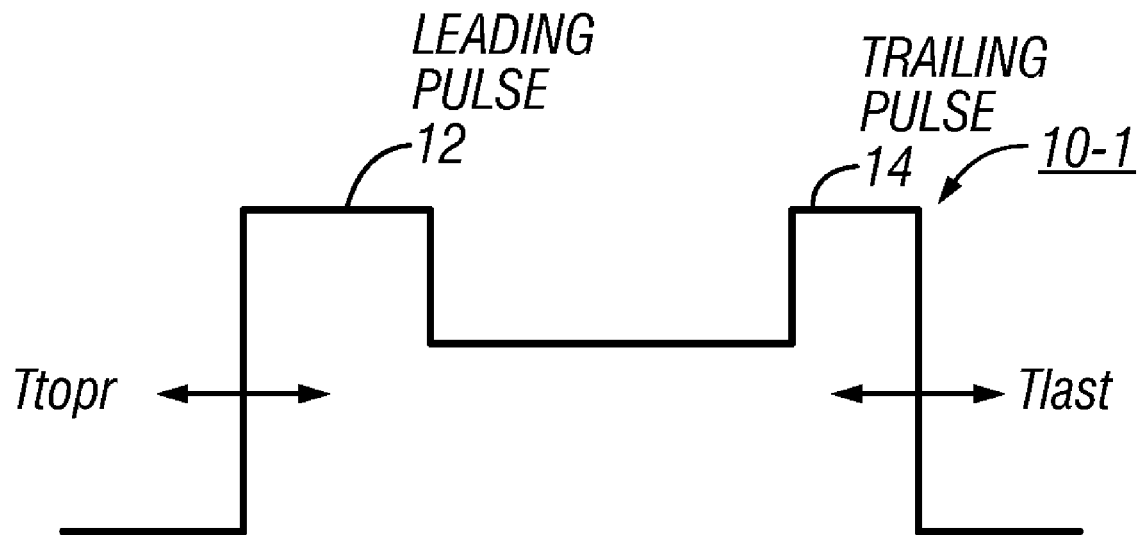
FIGS. 20A and 20B are schematic diagrams showing examples of other factors to be adjusted, determined in step S26 shown in FIG. 2.
Figure 20B:
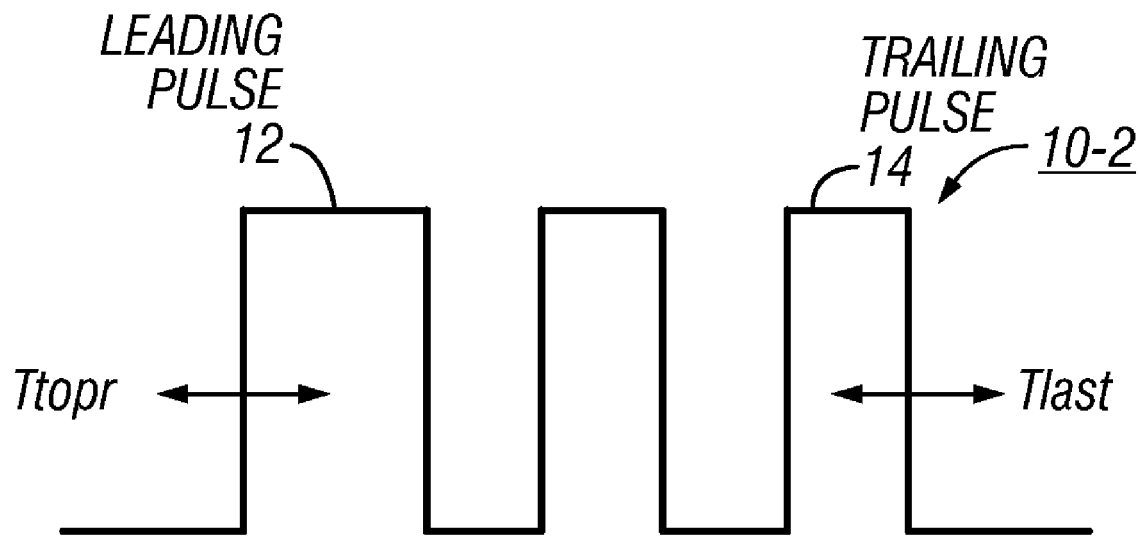

FIGS. 20A and 20B are schematic diagrams showing examples of other factors to be adjusted, determined in step S26 shown in FIG. 2. Similarly to FIGS. 18A and 18B, FIG. 20A shows an example where a single-pulse pattern is used, and FIG. 20B shows an example where a multiple-pulse pattern is used.

As shown in FIGS. 20A and 20B, whether the single-pulse pattern 10-1 or the multiple-pulse pattern 10-2 is used, Ttopr for adjusting the starting position of the leading pulse 12, and Tlast for adjusting the ending position of the trailing pulse 14 are set as other factors to be adjusted. By adjusting these values, a pulse pattern with which a pit length after recording has an appropriate value is selected.

The main power PW, the leading pulse width Ttop, the low power region PWD, the leading pulse position Ttopr, and the trailing pulse position Tlast, obtained by the procedure described above, are stored in the memory 38 shown in FIG. 1 to finish the determination of recording condition.

Recording of Information

The LD controller 36 shown in FIG. 1 generates recording pulses based on various recording conditions stored in the memory 38 for information to be recorded input to the drive 20, and outputs the recording pulses to the pickup 30. Thus, the information is recorded on the medium 16.

Another Embodiment of Determination of Test Region

Figure 21:
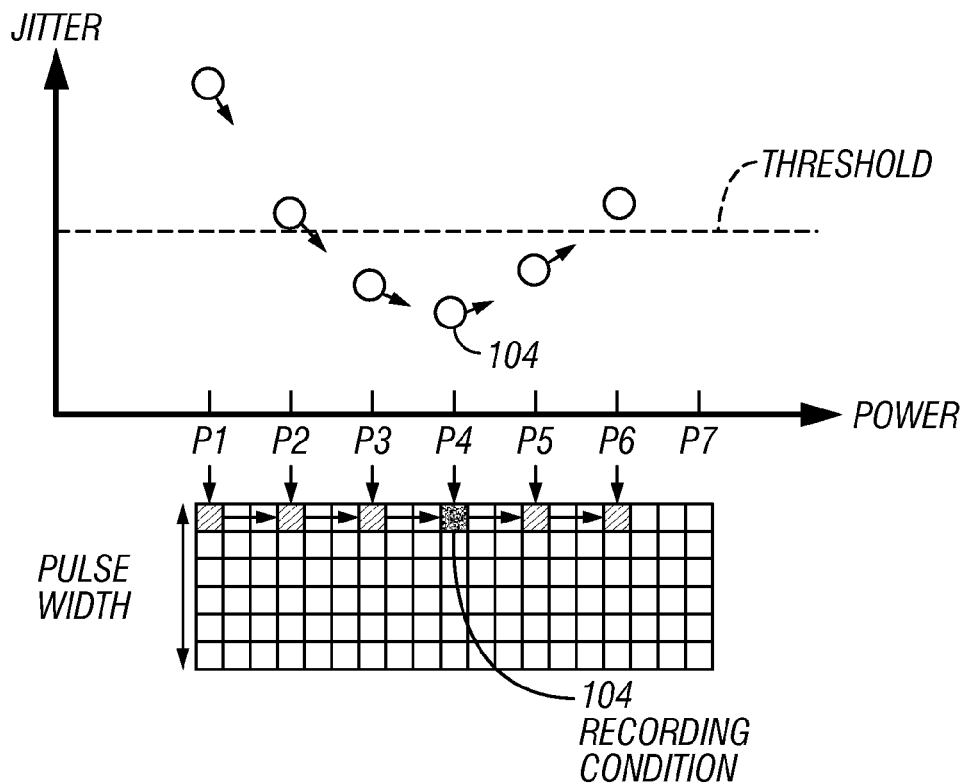
FIG. 21 is a schematic diagram showing an example where a test region extends up to a point which is over the threshold.

FIG. 21 is a schematic diagram showing an example where the test region extends up to a point where the jitter value exceeds the threshold. In the example shown in FIG. 21, the power used in test recording is varied from P1, P2, ... to P6, and the test is finished at P6 where the jitter value exceeds the threshold. As represented in an image matrix, the power is discretely changed from P1, P2, ... to P6 for a pulse width, and the power value P4 that minimizes the jitter value is used as a recording condition 104. In this case, the power range is defined by P1 to P6 over which the power is varied, and a range of P2 to P6 that is close to the region where the threshold is not exceeded serves as a power margin. As just described, the test region is extended up to a point where the threshold is reached, so that the number of times of testing is reduced compared with a case where testing is carried out over a constant power range.

Figure 22:
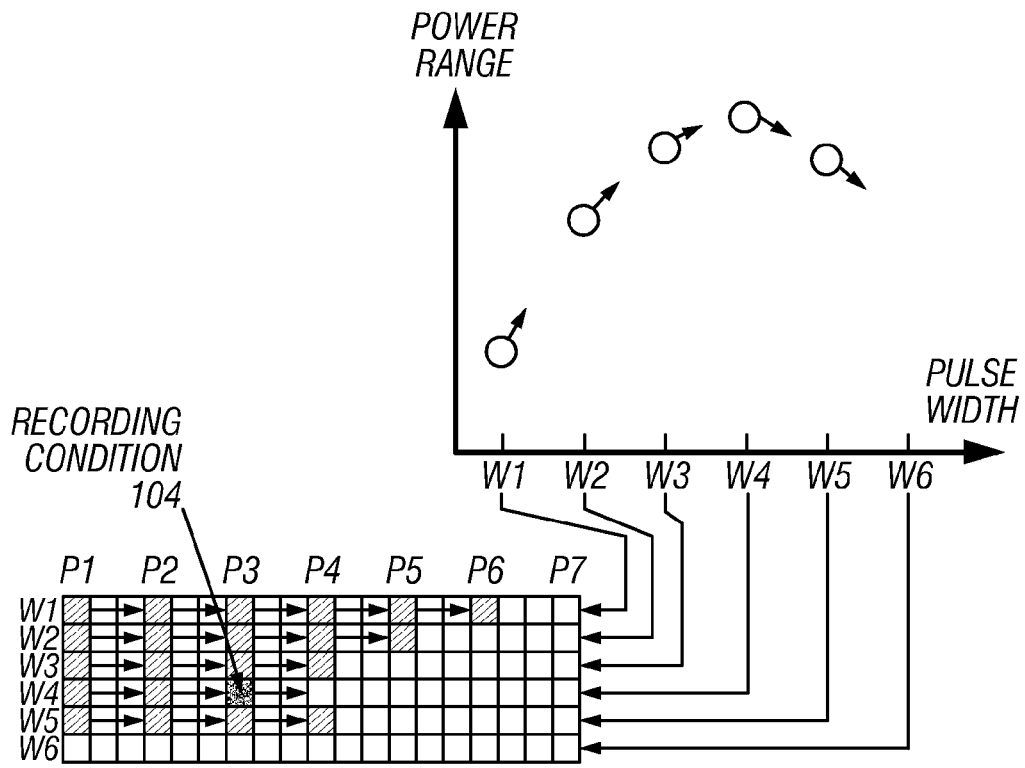
FIG. 22 is a schematic diagram showing an example where a test region extends up to a point where a pole of power range is obtained in addition to the procedure of the example shown in FIG. 21.

FIG. 22 is a schematic diagram showing an example where a test region extends up to a point where a pole of power range is obtained. In the example shown in FIG. 22, in addition to the procedure of the example shown in FIG. 21, pulse width is varied, and the poles of power range or power margin obtained for the respective pulse widths are used as recording conditions. In this example, while sequentially changing pulse width as W1, W2, ..., power is changed for each of the pulse widths up to a point where the threshold is reached as shown in FIG. 21, and this step is repeated until a pulse width W4 that maximizes power range or power margin is identified.

The pole of power range or power margin can be identified by examining the amount of change between values of adjacent sample points. Thus, when the pulse width W4 is a pole, test recording is carried out up to the subsequent pulse width W5. The power range and power margin differ among each pulse widths, so that the hatched region that are tested differs depending on the pulse width.

When the pulse width W4 is a pole, the pulse width W4 and a power P3 that minimizes the jitter value for the pulse width W4 are used as a recording condition 104. As just described, by changing the pulse width in addition to the procedure of the example shown in FIG. 21, the test region can be extended in the direction of pulse width with a small number of times of testing.

Figure 23:
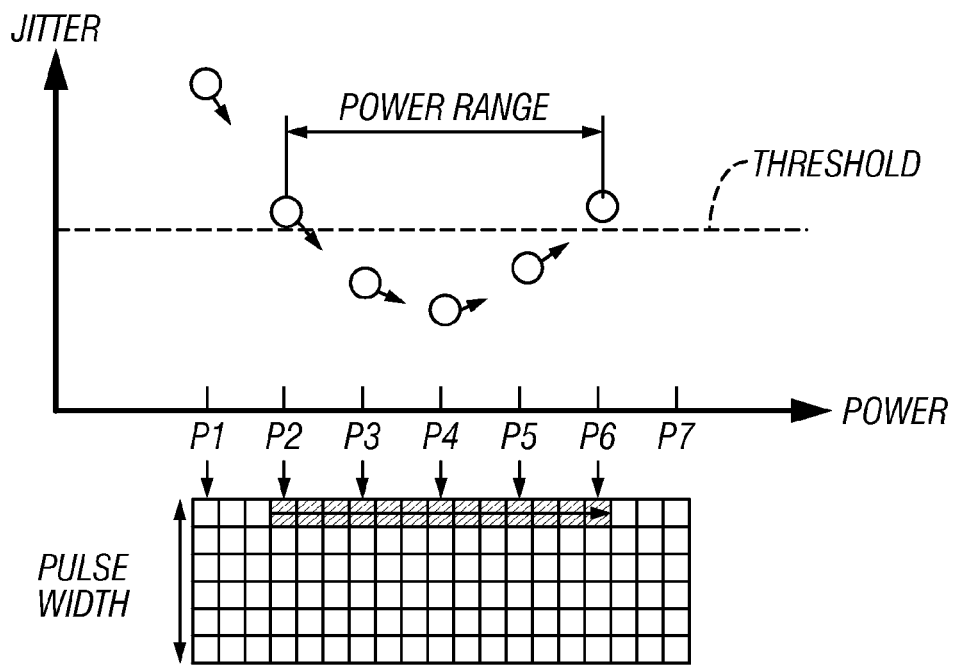
FIG. 23 is a schematic diagram showing an example where a range between two points in the vicinity of the threshold is used as a power range.

FIG. 23 is a schematic diagram showing an example where a power range is defined by two points in the vicinity of the threshold. In the example shown in FIG. 23, the power value is gradually changed until a value in the vicinity of the threshold is obtained, and a power range is determined based on large and small power values in the vicinity of the threshold. The procedure for this example is the same as that in the example shown in FIG. 17, so that a description thereof will be omitted.

This example differs from the example shown in FIG. 21 in that instead of testing sampling points between P2 and P6 alone, after determining a power range, the power is varied by a smaller step size over the range to determine a more suitable condition.

Figure 24:
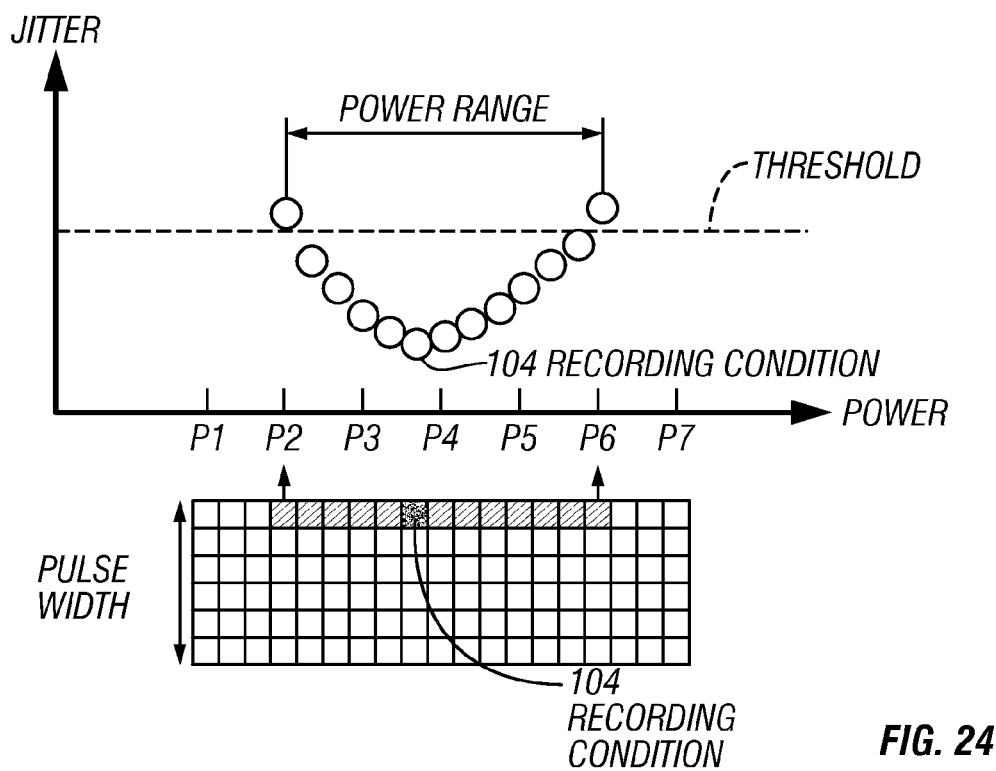
FIG. 24 is a schematic diagram showing an example where power value is varied by a smaller step size over the power range.

FIG. 24 is a schematic diagram showing an example where the power value is varied by a smaller step size over the power range. As shown in FIG. 24, the power value is varied by a smaller step size over the power range P2 to P6, and a power value that minimizes the jitter value is used as a recording condition 104. As just described, by examining the power range by a smaller step size, a value approximate to an optimal value is obtained. In this example, an optimal point is found between P3 and P4.

Figure 25:
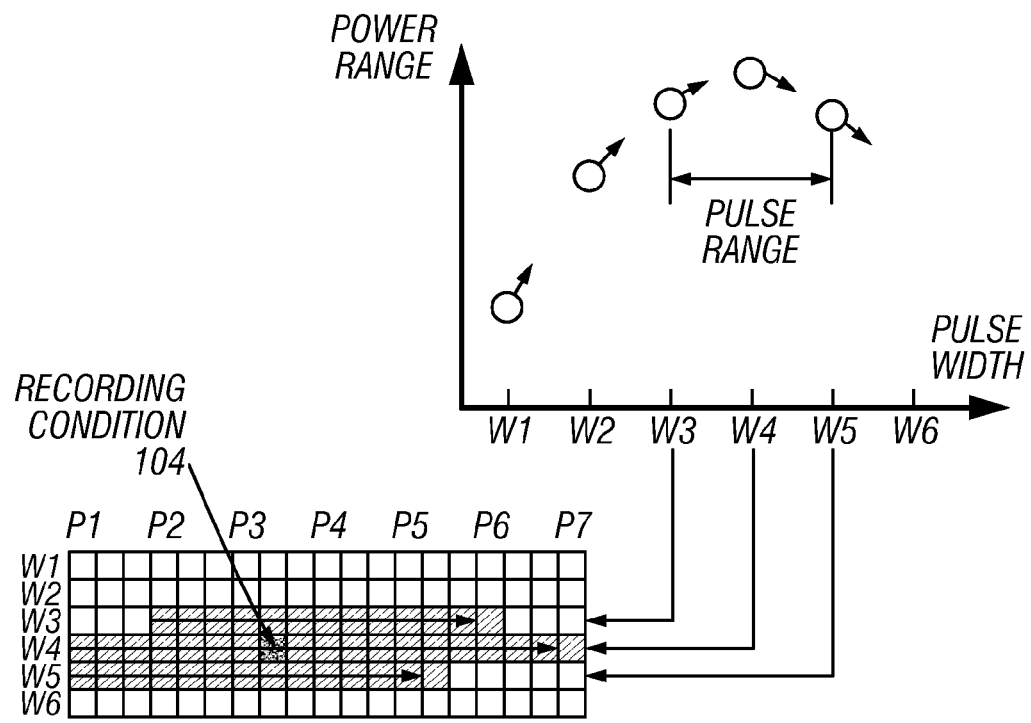
FIG. 25 is a schematic diagram showing an example where a test region extends up to a point where a pole of power range is obtained in addition to the procedure of the example shown in FIG. 24.

FIG. 25 is a schematic diagram showing an example where a test region extends up to a point where a pole of power range is obtained in addition to the procedure of the example shown in FIG. 24. In the example shown in FIG. 25, the pulse width is varied in addition to the procedure of the example shown in FIG. 24, and a pole of power range or power margin obtained for each pulse width is used as a recording condition. This scheme is the same as the scheme of applying the procedure of the example shown in FIG. 21 to the example shown in FIG. 22, so that a description thereof will be omitted.

Figure 26:
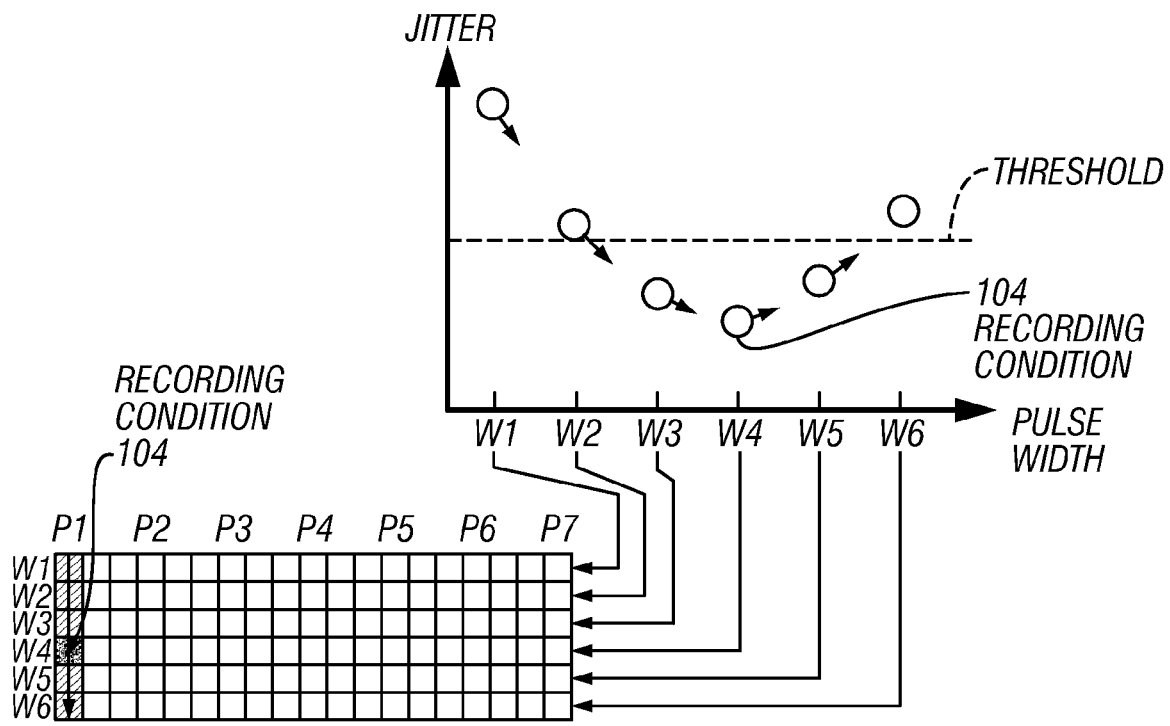
FIG. 26 is a schematic diagram showing an example where pulse width is changed up to a point where the threshold is exceeded and the range of change is used as a test region.

FIG. 26 is a schematic diagram showing an example where the pulse width is changed up to a point where the jitter value exceeds the threshold, and the range of changing the pulse width is used as a test region. In the example shown in FIG. 26, the pulse width used for test recording is sequentially changed as W1, W2, ..., and the test recording is finished at W6 at which the jitter value exceeds the threshold. As represented by an image matrix, the pulse width is sequentially changed as W1, W2, ... W6 for the power P1, and the pulse width W4 that minimizes the jitter value among W1 to W6 is used as a recording condition 104. In this case, the pulse range to be tested is W1 to W6 over which the pulse width is varied, and the pulse margin is W2 to W6 that is close to a region where the jitter value does not exceed the threshold. As just described, by using a test region up to a point where the jitter value reaches the threshold, the number of times of testing is reduced compared with a case where a fixed pulse range is always used for testing.

Figure 27:
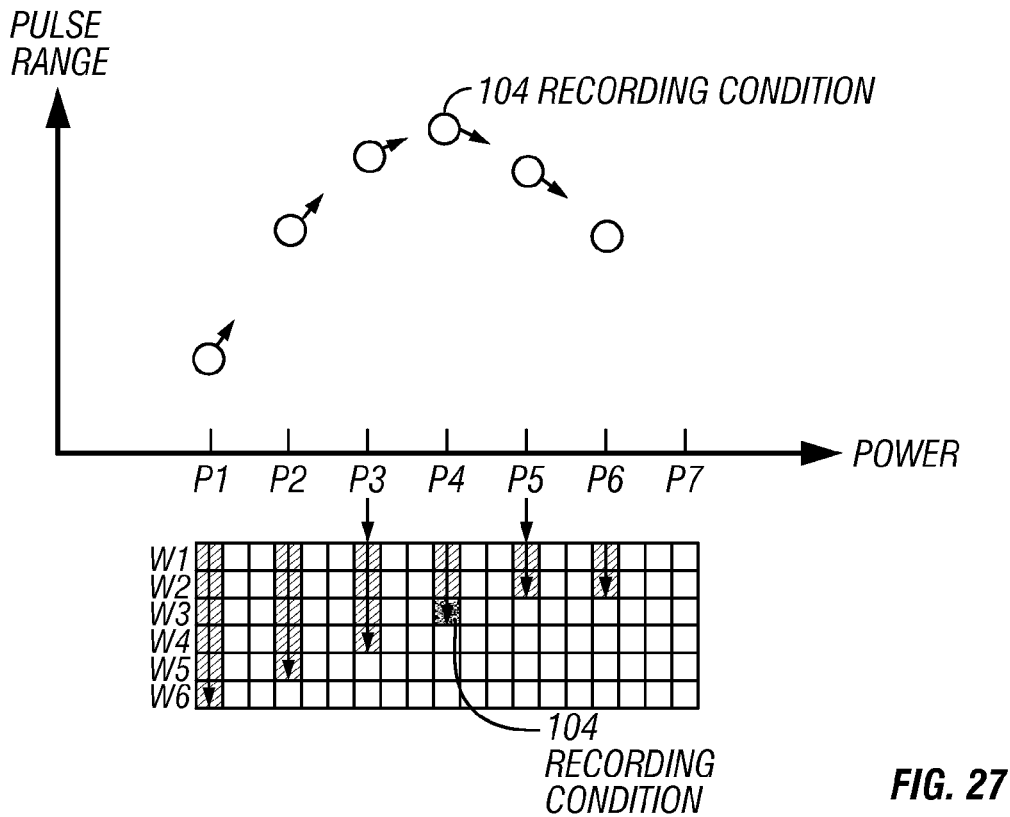
FIG. 27 is a schematic diagram showing an example where a test region extends up to a point where a pole of pulse range is obtained in addition to the procedure of the example shown in FIG. 26.

FIG. 27 is a schematic diagram where the test region extends up to a point where a pole of pulse range is obtained. In the example shown in FIG. 27, in addition to the procedure of the example shown in FIG. 26, the power value is varied and a pole of pulse range or pulse margin determined for each power value is used as a recording condition. In this example, while sequentially changing the power value as P1, P2, ..., the pulse width is changed for each power value until the jitter value reaches the threshold shown in FIG. 26, and this step is repeated until power P4 that maximizes the pulse range or pulse margin is identified.

The pole of pulse range or pulse margin can be identified by examining the amount of change between values at adjacent sample points. Thus, when the power P4 is a pole, test recording is carried out up to the subsequent power P5. Since the pulse range and pulse margin differ depending on the power value, the hatched region to be tested differs depending on the power value, as represented in the matrix image shown in FIG. 27.

When the power P4 is a pole, the power P4 and the pulse width W3 that minimizes the jitter value for the power P4 are used as recording condition 104. As just described, by varying the power value in addition to the procedure of the example shown in FIG. 26, the test region can be extended in the direction of power with a small number of times of testing.

Figure 28:
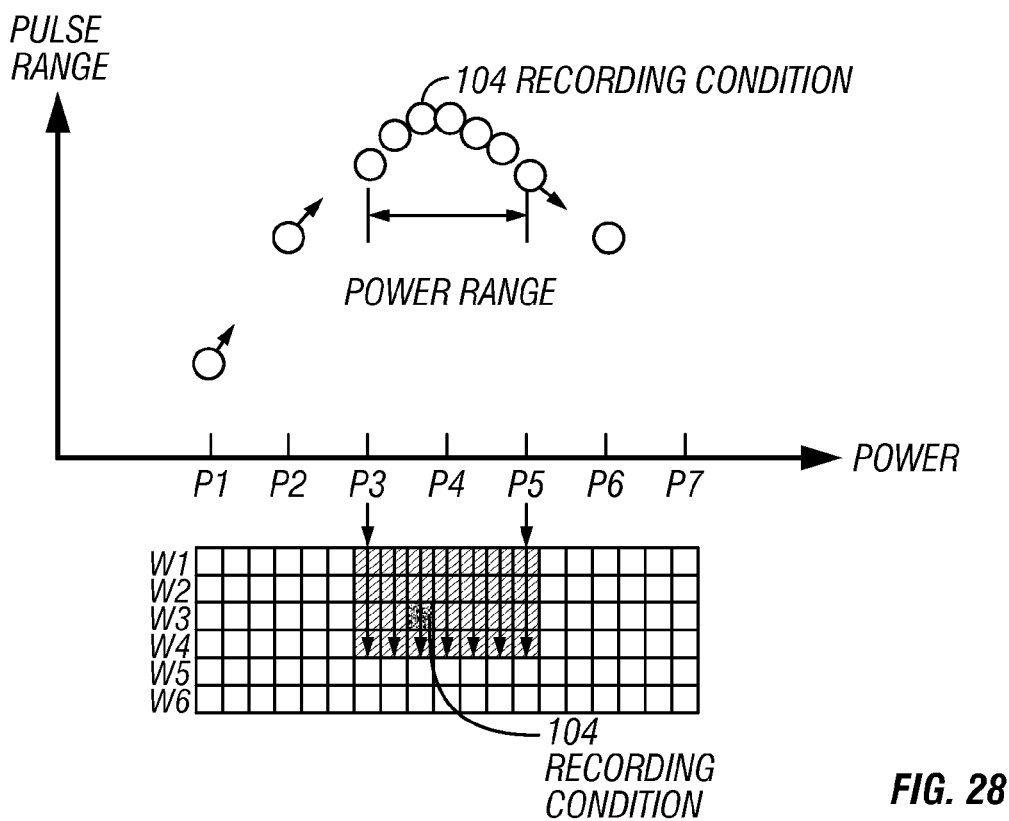
FIG. 28 is a schematic diagram showing an example where pulse width is varied by a smaller step size over the pulse range.

FIG. 28 is a schematic diagram showing an example where the power value is varied over the pulse range by a smaller step size. As shown in FIG. 28, the power value is varied by a smaller step size over P3 to P5 in the vicinity of the pole of the pulse range identified in FIG. 27, and a condition that minimizes the jitter value is used as a recording condition 104. As just described, by varying the power value in the vicinity of the pole by a smaller step size, a value approximate to an optimal value can be found. In this example, an optimal point is found between P3 and P4.

Figure 29:
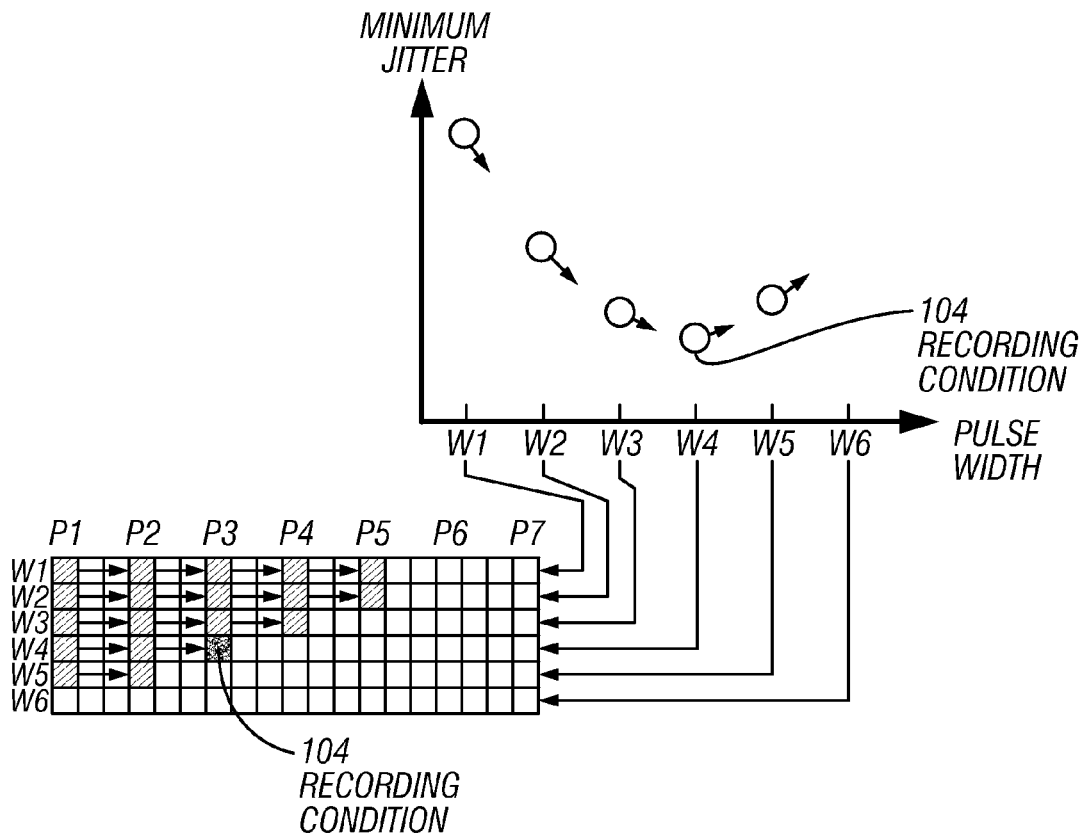
FIG. 29 is a schematic diagram showing an example where a test region extends up to a point where a pole of minimum jitter is obtained in addition to the procedure of the example shown in FIG. 21.

FIG. 29 is a schematic diagram showing an example where the test region extends up to a point where the pole of minimum jitter is obtained, in addition to the procedure of the example shown in FIG. 21. In the example shown in FIG. 29, in addition to the procedure of the example shown in FIG. 21, the pulse width is varied and the pole of minimum jitter determined for each pulse width is used as a recording condition. In this example, the pulse width is sequentially changed as W1, W2, . . . , and the procedure shown in FIG. 21 is executed for each of the pulse widths. While comparing the minimum jitter values thereby obtained, this step is repeated until a pulse width W4 that minimizes the jitter value is identified.

The pole of minimum jitter value can be identified by examining the amount of change between values at adjacent sample points. Thus, when the pulse width W4 is a pole, test recording is carried out up to the subsequent pulse with W5. Since the minimum jitter value differs depending on the pulse width, the hatched region that is tested differs depending on the pulse width, as represented in the matrix image shown in FIG. 29.

When the pulse width W4 is a pole, the pulse width W4 and a power P3 that minimizes the jitter value for the pulse width W4 are used as a recording condition 104. As just described, by detecting a pole of the minimum jitter value in addition to the procedure of the example shown in FIG. 21, the test region can be extended in the direction of pulse width with a small number of times of testing.

Figure 30:
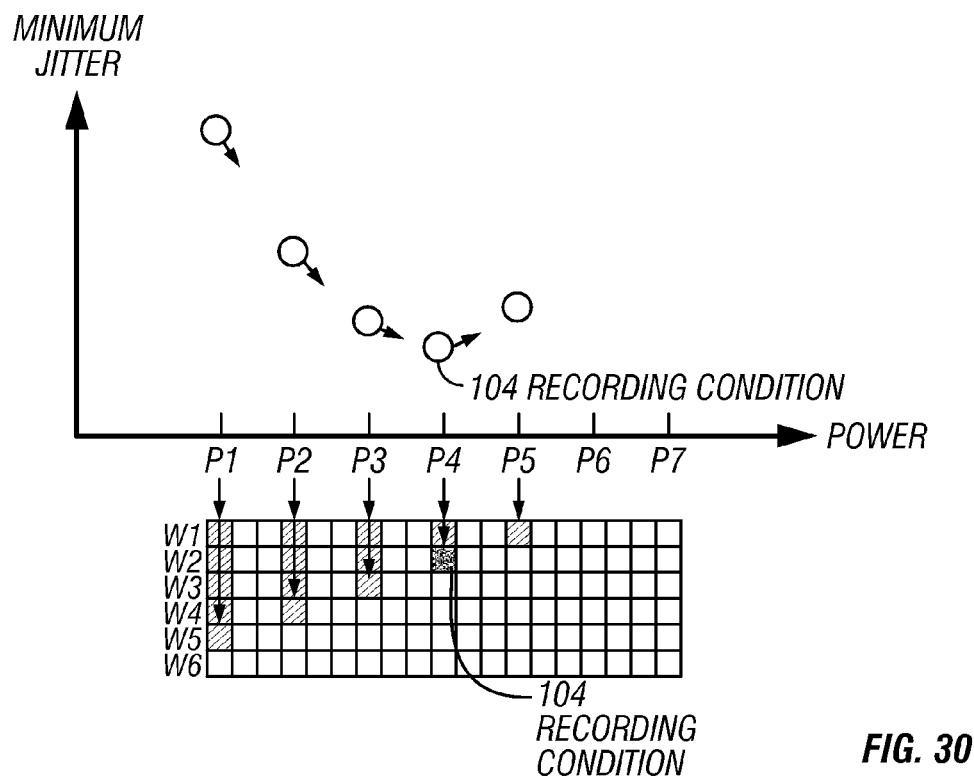
FIG. 30 is a schematic diagram showing an example where a test region extends up to a point where a pole of minimum jitter is obtained in addition to the procedure of the example shown in FIG. 26.

FIG. 30 is a schematic diagram showing an example where the test region extends up to a point where a pole of minimum jitter value is obtained, in addition to the procedure of the example shown in FIG. 26. In the example shown in FIG. 30, in addition to the procedure of the example shown in FIG. 26, power is varied and a pole of minimum jitter value determined for each power value is used as a recording condition. In this example, the power value is sequentially changed as P1, P2, . . . , and the procedure of the example shown in FIG. 26 is executed for each of the power values. While comparing the minimum jitter values thereby obtained, this step is repeated until a power P4 that minimizes the jitter value is identified.

The pole of minimum jitter value can be identified by examining the amount of change between values at adjacent sample points. Thus, when the power P4 is a pole, test recording is carried out up to the subsequent power W5. Since the minimum jitter value differs depending on the power value, the hatched region that is tested differs depending on the power value, as represented in the matrix image shown in FIG. 30.

When the power value P4 is a pole, the power value P4 and a pulse width W2 that minimizes the jitter value for the power value P4 are used as recording condition 104. As just described, by detecting a pole of the minimum jitter value in addition to the procedure of the example shown in FIG. 26, the test region can be extended in the direction of pulse width with a small number of times of testing.

As just described, according to this embodiment, a power value and/or a pulse range used in test recording are determined based on testing of recording quality, so that a more suitable recording condition can be determined by a smaller number of times of testing.

Preferably, recording quality is tested under a recording environment that is similar to an actual recording environment in view of medium characteristics, drive characteristics, and matching therebetween, determining a test condition based on the result of testing.

Instead of changing the number of times of testing, the test region may be shifted in accordance with the result of testing of recording quality. For example, the following schemes may be employed when recording characteristics are predicted to have the same sensitivity, low sensitivity, and high sensitivity, respectively.

(1) When the sensitivity of recording medium is the same as the sensitivity of reference medium It is determined that the reference recording condition used for the prediction is close to an optimal condition. Thus, the power value and pulse width are extended by predetermined amounts with respect to the reference recording condition, and the resulting region is used as a test region. For example, when the reference recording condition is a power P and a pulse width W, the test region for the power value is P±5 mW, and the test region for the pulse width is W±0.2T.

(2) When the sensitivity of recording medium is lower than the sensitivity of the reference medium It is determined that an optimal value for the recording medium requires more heat than an optimal value for the reference medium. Thus, the test region is shifted to the side of high power and wide pulse width. For example, when the reference recording condition is a power P and a pulse width W, the test region for the power value is P to P+10 mW, and the test region for the pulse width is W to W +0.4T.

(3) When the sensitivity of recording medium is higher than the sensitivity of the reference medium It is determined that an optimal value for the recording medium requires less heat than an optimal value for the reference medium. Thus, the test region is shifted to the side of low power and narrow pulse width. For example, when the reference recording condition is a power P and a pulse width W, the test region for the power value is P−10 mW to P, and the test region for the pulse width is W−0.4T to W.

That is, in the example described above, with respect to the power P and the pulse width W, a region formed by an area defined by a power range of 10 mW and a pulse range of 0.4 is shifted in accordance with recording characteristics so that a more suitable recording condition will be obtained. The test region may be determined based on the eight patterns shown in FIG. 14 and described earlier.

While the above description has pointed out novel features of the invention as applied to various embodiments, the skilled person will understand that various omissions, substitutions, and changes in the form and details of the device or process illustrated may be made without departing from the scope of the invention. Therefore, the scope of the invention is defined by the appended claims rather than by the foregoing description. All variations coming within the meaning and range of equivalency of the claims are embraced within their scope.

What is claimed is:

1. An optical recording method for recording information on an optical recording medium by irradiating a laser pulse, the method comprising:

retrieving a recording quality threshold, a pulse width, and at least first, second, and third recording power levels that have been obtained from test recording on a reference medium, wherein the first power level is less than the second power level and the second power level is less than the third power level, wherein the first, second, and third power levels produce respective recording qualities on the reference medium, wherein the second power level produces a better recording quality on the reference medium than the first power level and the third power level, and wherein said recording quality threshold is obtained by multiplying a reference medium recording quality by a coefficient;

test recording on an optical recording medium different from said reference medium using the retrieved pulse width in combination with at least each of the first, second, and third power levels, thereby obtaining at least a respective first, second, and third measurement of recording quality on the optical recording medium;

comparing the first, second and third measurements of recording quality on the optical recording medium to each other and to said threshold;

determining that the optical recording medium has the same sensitivity as the reference medium if the second measurement of recording quality on the optical recording medium is better than the first and third measurements of recording quality on the optical recording medium;

determining that the optical recording medium has the same sensitivity as the reference medium if the first, second, and third measurements of recording quality on the optical recording medium are all better than said threshold regardless of their recording qualities relative to each other;

determining that the optical recording medium has lower sensitivity than the reference medium if the third recording quality on the optical recording medium is better than the second recording quality on the optical recording medium and the second recording quality on the optical recording medium is better than the first recording quality on the optical recording medium;

determining that the optical recording medium has much lower sensitivity than the reference medium if the third recording quality on the optical recording medium is better than the second recording quality on the optical recording medium and the second recording quality on the optical recording medium is better than the first recording quality on the optical recording medium and all of the first, second, and third recording qualities on the optical recording medium are worse than said threshold;

determining that the optical recording medium has a higher sensitivity than the reference medium if the first recording quality on the optical recording medium is better than the second recording quality on the optical recording medium and the second recording quality on the optical recording medium is better than the third recording quality on the optical recording medium;

determining that the optical recording medium has a much higher sensitivity than the reference medium if the first recording quality on the optical recording medium is better than the second recording quality on the optical recording medium and the second recording quality on the optical recording medium is better than the third recording quality on the optical recording medium and all of the first, second, and third recording qualities on the optical recording medium are worse than said threshold;

determining a test recording region of pulse widths and power levels for further test recording on said optical recording medium based at least in part on the determined sensitivity of the optical recording medium; and performing further test recording on the optical recording medium using a plurality of pulse widths and power conditions defined by the test recording region.

2. The optical recording method according to claim 1, wherein the plurality of pulse widths defined by the test recording region vary by 0.1T, 0.2T, or 0.4T based at least in part on the determined sensitivity.

3. The optical recording method according to claim 1, further comprising approximating a curve defined by the first, second, and third measurements of recording quality on the optical recording medium as plotted against the first, second, and third power values, wherein the plurality of power conditions defined by the test recording region are selected from a power range where the approximated curve does not exceed the threshold.

4. The optical recording method according to claim 1, wherein the sensitivity of the optical recording medium in comparison to the reference medium is not determined when the first and third measurements of recording quality on the optical recording medium are better than the second measurement of recording quality on the optical recording medium, and the second measurement of recording quality on the optical recording medium is worse than the threshold.

5. The optical recording method according to claim 1, further comprising determining a combination of pulse width and power condition that optimizes recording quality on the optical recording medium, and recording user information on the optical recording medium using the pulse width and power condition combination.

* * * * *

UNITED STATES PATENT AND TRADEMARK OFFICE
CERTIFICATE OF CORRECTION

| | |
|---|---|
| PATENT NO. | : 7,639,578 B2 |
| APPLICATION NO. | : 11/088635 |
| DATED | : December 29, 2009 |
| INVENTOR(S) | : Kakimoto et al. |

It is certified that error appears in the above-identified patent and that said Letters Patent is hereby corrected as shown below:

Column 8, line 51, which reads, "an RE detector", should read -- an RF detector --

Column 8, line 52, which reads, "an RE signal", should read -- an RF signal --

Signed and Sealed this

Third Day of August, 2010

David J. Kappos
*Director of the United States Patent and Trademark Office*